United States Patent [19]
Sethuram et al.

[11] Patent Number: 6,058,114
[45] Date of Patent: *May 2, 2000

[54] UNIFIED NETWORK CELL SCHEDULER AND FLOW CONTROLLER

[75] Inventors: Jay Sethuram, Saratoga; Mark Snesrud, Sunnyvale; Rob Maffit, San Carlos, all of Calif.

[73] Assignee: Cisco Systems, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/652,626

[22] Filed: May 20, 1996

[51] Int. Cl.[7] .................................................... H04L 12/56
[52] U.S. Cl. ......................... 370/397; 709/233; 709/234; 709/235; 370/235; 370/231
[58] Field of Search .................................. 370/94.2, 395, 370/229, 230, 231, 235, 236, 253, 389, 391, 396, 398, 399, 412, 465; 395/880; 709/233, 234, 235

[56] References Cited

U.S. PATENT DOCUMENTS

| | | | |
|---|---|---|---|
| 5,367,523 | 11/1994 | Chang et al. | 370/235 |
| 5,533,009 | 7/1996 | Chen . | |
| 5,533,021 | 7/1996 | Branstad et al. | 370/60.1 |
| 5,563,885 | 10/1996 | Witchey | 370/94.2 |
| 5,675,576 | 10/1997 | Kalampoukas et al. | 370/232 |
| 5,706,288 | 1/1998 | Radhakrishnan et al. | 370/389 |
| 5,765,032 | 6/1998 | Valizadeh | 370/235 |
| 5,777,984 | 7/1998 | Gun et al. | 370/230 |
| 5,793,747 | 8/1998 | Kline | 370/230 |
| 5,796,735 | 8/1998 | Miller et al. | 370/395 |
| 5,805,577 | 9/1998 | Jain et al. | 370/234 |
| 5,812,527 | 9/1998 | Kline et al. | 370/230 |

FOREIGN PATENT DOCUMENTS 9719567  5/1997  WIPO .

OTHER PUBLICATIONS

Bonomi et al., "The Rate–based Flow Control Framework for the Available Bit Rate ATM Service", *IEEE Network*, vol. 9, iss. 2, pp. 25–39, Mar.–Apr. 1995.

Liebeherr et al., "A Multi–level Explicit Rate Control Scheme for ABR Traffic with Heterogenous Service Requirements", *Proceedings of the 16th International Conference on Distributed Computing Systems, 1996*, IEEE, pp. 570–577, May 27–30, 1996.

"A Multi–Level Explicit Rate Control Scheme for ABR Traccif with Heterogeneous Service Requirements", by Liebeherr, J.; Akyildiz, I.F.; Tai, A. printed from http://iel.ihs.com:80/cgi–bin/iel at IEEE/IEE Electronic Library online, Citation and Abstract, 10pp.

"The Rate–Based Flow Control Framework for the Available Bit Rate ATM Service", by Bonomi, F.; Fendick, K.W. printed from http://iel.ihs.com:80/cgi–bin/iel at IEEE/IEE Electronic Library online, Citation and Abstract, 17pp.

(List continued on next page.)

*Primary Examiner*—William M. Treat
*Attorney, Agent, or Firm*—J.P. Blasko Professional Corp.; John P. Blasko

[57] ABSTRACT

The present invention includes a method and apparatus for prioritizing and scheduling ATM cells that are competing for a given time slot for transmission onto a network. A segmentation and reassembly controller establishes a data structure within a memory. The preferable data structure includes a virtual connection time table and a virtual connection parameter table that use linked lists to index to one another. The segmentation and reassembly (SAR) controller includes a sorter for determining the priority of the ATM cells and selecting one for a given time slot and a microcode engine to compute next scheduled time slot and adjust the virtual connection parameter table for a given virtual connection. Coupled to the microcode engine is a random access memory for storing microcode programs so that the SAR may be programmed to prioritize and schedule in a different manner.

21 Claims, 18 Drawing Sheets

OTHER PUBLICATIONS

Integrated Device Technology, Inc., "Preliminary Information IDT77201, 155Mpbs ATM SAR Controller for PCI–Based Networking Applications", Jan. 1996,pp. 1,14–19.

Brooktree Corp., "Product Brief Bt8230, ATM Segmentation and Reassembly Controller", 1995, pp. 1–6.

Texas Instruments, "Product Bulletin, ThunderCELL ATM familty TNETA 1561, 25–155Mbps single–chip SAR", 1995, 2 pages.

Texas Instruments, "Product Bulletin, ThunderCELL TM familty—HyperSAR", 1995, 2 pages.

StrataCom, Inc., "StrataComService Note, Available Bit Rate Services: The Essence of ATM", 1995, 4 pages.

Othmar Kyas, "ATM Networks", 1995, pp. 132–136, 147–188, 259–265.

Martin De Prychker, "Asynchronous Transfer Mode, Solution for Broadband ISDN", 1995, pp. 302–342.

Uyless Black, "ATM:Foundation For Broadband Networks", 1995, pp. 137–180, 203–240.

Wlliam Stallings, "ISDN and Broadband ISDN with Frame Relay and ATM", 1995, pp. 492–532.

David McDysan & Darren Spohn, "ATM, Theory and Application", 1995, pp. 347–457.

The ATM Forum, "ATM User–Network Interface (UNI) Specification, v3.1", 1995, pp. 49–103, 316–341.

FIG. 3
(PRIOR ART)

| ES1 | ES2 | ES3 | ES1 | ES1 | ES1 | ES2 | ES1 | ES1 | ES3 |
|-----|-----|-----|-----|-----|-----|-----|-----|-----|-----|
| V | D | A | V | I | I | D | V | V | A |
| 301 | 302 | 303 | 304 | 305 | 306 | 307 | 308 | 309 | 310 | 311 |

FIG. 6

| ES1 | ES2 | ES3 | ES1 | ES1 | ES1 | ES2 | ES1 | ES1 | ES3 |
|-----|-----|-----|-----|-----|-----|-----|-----|-----|-----|
| V | D | A | V | V | V | D | V | V | A |
| 301 | 302 | 303 | 304 | 605 | 606 | 307 | 308 | 609 | 310 | 311 |

FIG. 7B

| FIELD | OCTET | BIT(s) | DESCRIPTION | INITIAL VALUE ||
| | | | | IF SOURCE-GENERATED | IF SWITCH-GENERATED OR DESTINATION-GENERATED |
| --- | --- | --- | --- | --- | --- |
| Header | 1-5 | all | ATM Header | RM_VPC: VCI=6 and PTI=110 RM_VCC: PTI=110 ||
| ID | 6 | all | Protocol Identifier | 1 ||
| DIR | 7 | 8 | Direction | 0 | 1 |
| BN | 7 | 7 | BECN Cell | 0 | 1 |
| CI | 7 | 6 | Congestion Indication | 0 | either CI=1 or NI=1 or both |
| NI | 7 | 5 | No Increase | 0 or 1 | |
| RA | 7 | 4 | Request/ Acknowledge | 0 or set in accordance with I.371-draft ||
| Reserved | 7 | 3-1 | Reserved | 0 ||
| ER | 8-9 | all | Explicit Cell Rate | a rate not greater than PCR parameter | any rate value |
| CCR | 10-11 | all | Current Cell Rate | ACR Parameter | 0 |
| MCR | 12-13 | all | Minimum Cell Rate | MCR Parameter | 0 |
| QL | 14-17 | all | Queue Length | 0 or set in accordance with I.371-draft ||
| SN | 18-21 | all | Sequence Number | 0 or set in accordance with I.371-draft ||
| Reserved | 22-51 | all | Reserved | 6A (hex) for each octet ||
| Reserved | 52 | 8-3 | Reserved | 0 ||
| CRC-10 | 52 | 2-1 | CRC-10 | See Section 5.10.3.1 ||
| | 53 | all | | ||

| 8 | 7 | 6 | 5 | 4 | 3 | 2 | 1 |
| --- | --- | --- | --- | --- | --- | --- | --- |
| DIR | BN | CI | NI | RA | Res. | Res. | Res. |

DIR = 0 for forward RM cells
    = 1 for backward RM celld
BN = 1 for Non-Source Generated (BECN) RM cells
    = 0 for Source Generated RM cells
CI = 1 to indicate congestion
    = 0 otherwise
NI = 1 to indicate no additive increase allowed
    = 0 otherwise
RA - Not used for ABR. See description below

FIG. 7C

| TX/RX | ID # | NAME | DEFINITION | BITS |
|---|---|---|---|---|
| TX | 12 | TxBufAdr | CURRENT READ ADDRESS | 32 |
| RX | 13 | RxBufAdr | CURRENT WRITE ADDRESS | 32 |
| TX | 3 | TxBytesRemain | TRANSMIT BYTES LEFT IN BUFFER | 16 |
| RX | 4 | RxBytesremain | RECEIVE BYTES LEFT IN BUFFER | 16 |
| TX | 1 | TxCurrentBD | TRANSMIT CURRENT BUFFER DESCRIPTOR POINTER | 16 |
| RX | 2 | RxCurrentBd | RECEIVE CURRENT BUFFER DESCRIPTOR POINTER | 16 |
| TX | 6 | TxCRC | TRANSMIT RUNNING PDU CRC | 32 |
| RX | 7 | RxCRC | RECEIVE RUNNING PDU CRC | 32 |
| TX | 8 | TxAAL Type | AAL SERVICE FOR TX VC | 2 |
| RX | 9 | RxAAL Type | AAL SERVICE FOR RX VC | 2 |
| TX | 10 | TxDone Mailbox | MAILBOX TO RETURN SENT BUFFER DESCRIPTOR | 1 |
| RX | 11 | RxBuf Mailbox | MAILBOX TO SEND FULL BUFFERS TO HOST | 1 |
| TX | 14 | EOPCell | SEND EOPDU-ONLY CELL | 1 |
| TX | 15 | Exhausted | TX HAD DATA OR NOT | 1 |
| RX | 26 | PH Freelist | PDU HEADER FREE LIST | 8 |
| RX | 27 | PPFreelist | PDU PAYLOAD FREE LIST | 8 |
| RX | 28 | PDU Payload | INDICATES IF IN PAYLOAD YET (1ST BUFFER FILLED) | 8 |
| RX | 30 | PDU Intr | INTERRUPT ON BUFFER FULL, OR END OF PDU | 1 |
| RX | 31 | fwdRM | FORWARD VALID TYPE 1 RM CELLS TO HOST | 1 |
| RX | 32 | procRM | PROCESS VALID TYPE 1 RM CELLS | 1 |
| RX | 33 | fwdUnkRM | FORWARD UNKNOWN TYPE RM CELLS TO HOST | 1 |
| RX | 34 | reassyStartBin | WHICH INTERVAL REASSEMBLY STARTED IN | 2 |
| RX | 36 | Dropping | INDICATE IGNORE CELLS UNTIL EOP | 1 |
| TX | 37 | VPI | VIRTUAL PATH IDENTIFIER | 12 |
| TX | 38 | VCI | VIRTUAL CONNECTION IDENTIFIER | 16 |
| | | EFCI | EXPLICIT FORWARD CONGESTION INDICATION | 192 |
| | | | | |

FIG. 7D

| TX/RX | ID # | NAME | DEFINITION | BITS |
|---|---|---|---|---|
| | | PCR | PEAK CELL RATE | 16 |
| | | MCP | MINIMUM CELL PERIOD-INVERSE OF MINIMUM CELL RATE (MCR) | 16 |
| | | ICP | INITIAL CELL PERIOD-INVERSE OF INITIAL CELL RATE | 24 |
| | | RIF | RATE INCREASE FACTOR | 4 |
| | | Nrm | NUMBER OF CELLS MAXIMUM FOR EACH FORWARD RM CELL | 3 |
| | | RDF | RATE DECREASE FACTOR | 4 |
| | | ACP | ALLOWED CELL PERIOD-INVERSE OF ALLOWED CELL RATE (ACR) | |
| | | ADTF | ACP(ACR) DECREASE TIME FACTOR | 10 |
| | | Trm | UPPER BOUND FOR TIME BETWEEN FORWARD RM CELLS | 3 |
| | | FRTT | FIXED ROUND-TRIP TIME | 12 |
| | | CDF | CUTOFF DECREASE FACTOR | 3 |
| | | EP | EXPLICIT CELL PERIOD(INVERSE OF ECR) | 6 |
| | | CI | CONGESTION INDICATION | |
| | | NI | NO INCREASE | |
| | | CRM | MISSING RM CELL COUNT | |
| | | UnAck | COUNT OF IN-RATE FRM CELLS SENT SINCE LAST RECEIVED BRM | |
| | | rat | REASSEMBLY TIMEOUT | |
| | | Dither | | |
| | | TT | TRAFFIC TYPE(ABR/CR/VBR/UBR) | |
| | | NonFRM | COUNT OF IN-RATE CELLS SINCE LAST IN-RATE FRM SENT | |
| | | LastFRM | TIME LAST FRM WAS TRANSMITTED | |
| | | MatHi | HIGH ORDER BITS OF MATURATION TIME | |
| | | FSB | FLAG INDICATING FRM SENT SINCE BRM | |
| | | Deadline | EXPIRATION TIME FOR NEXT SCHEDULED CELL | |
| | | Next VC | POINTER TO NEXT VC WITH SAME MATURATION TIME | |
| | | | | |

FIG. 11

| Label | Description | Units and Range |
|---|---|---|
| PCR | The Peak Cell Rate, PCR is the cell rate which the source may never exceed. | In Cells/Sec, See Note 1 for range. |
| MCR | The Minimum Cell Rate, MCR, is the rate at which the source is always allowed to send. | In Cells/Sec, See Note 1 for range. |
| ICR | The Initial Cell Rate, ICR, is the rate at which a source should send initially and after an idle period. | In Cells/Sec, See Note 1 for range. |
| RIF | Rate Increase Factor, RIF, controls the amount by which the cell transmission rate may increase upon receipt of an RM-cell. | RIF is a power of two, ranging from 1/32,768 to 1. |
| Nrm | Nrm is the maximum number of cells a source may send for each forward RM-cell. | Power of 2 Range: 2 to 256 |
| Mrm | Mrm controls allocation of bandwidth between forward RM-cells, backward RM-cells, and data cells. | Constant fixed at 2 |
| RDF | The Rate Decrease Factor, RDF, controls the decrease in the cell transmission rate. | RDF is a power of 2 from 1/32,768 to 1 |
| ACR | The Allowed Cell Rate, ACR, is the current rate at which a source is allowed to send. | Units: Cells/Sec |
| CRM | Missing RM-cell count. CRM limits the number of forward RM-cells which may be sent in the absence of received backward RM-cells. | CRM is an integer. Its size is implementation specific. |
| ADTF | The ACR Decrease Time Factor is the time period between sending RM-cells before the rate is decreased to ICR. | Units: Seconds ADTF range: .01 to 10.23 sec: with granularity of 10ms. |
| Trm | Trm provides an upper bound on the time between forward RM-cells for an active source. | Units: milliseconds Trm is 100 times a power of 2 Range: $100 \times 2^{-7}$ to $100 \times 2^0$ |
| FRTT | The Fixed Round-Trip Time, FRTT, is the sum of the fixed and propagation delays from the source to a destination and back. | Units: 1 microseconds Range: 0 to 16.7 seconds |
| TBE | Transient Buffer Exposure, TBE, is the negotiated number of cells that the network would like to limit the source to sending during startup periods, before the first RM-cell returns. | Units: Cells Range: 0 to 16,777,215 |
| CDF | The Cutoff Decrease Factor, CDF, controls the decrease in ACR associated with CRM. | CDF is zero, or a power of two in the range 1/64 to 1. |
| TCR | The Tagged Cell Rate, TCR, limits the rate at which a source may send out-of-rate forward RM-cells. | TCR is a constant fixed at 10 cells/second. |

Note 1: Rates are signaled as 24 bit integers which have a minimum value of zero, and a maximum value of 16,777,215. However, RM-cells use a 16-bit floating point format (see Section 5.10.3.2.) which has a maximum value of 4,290,772,992.

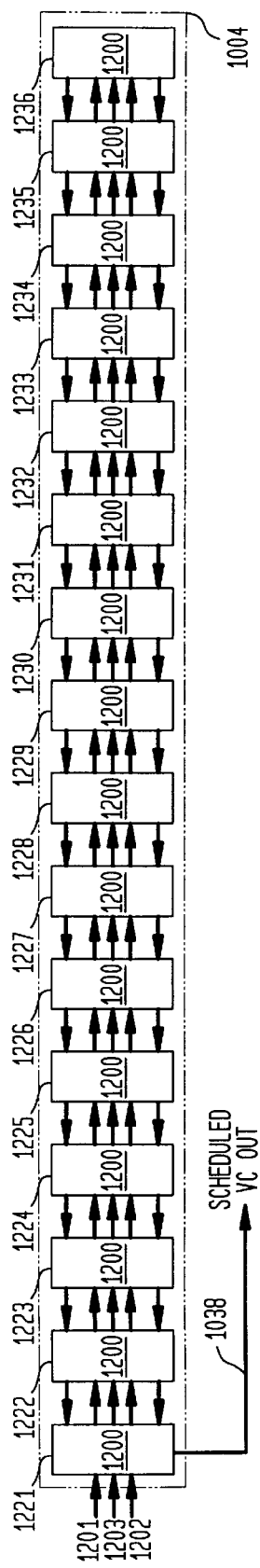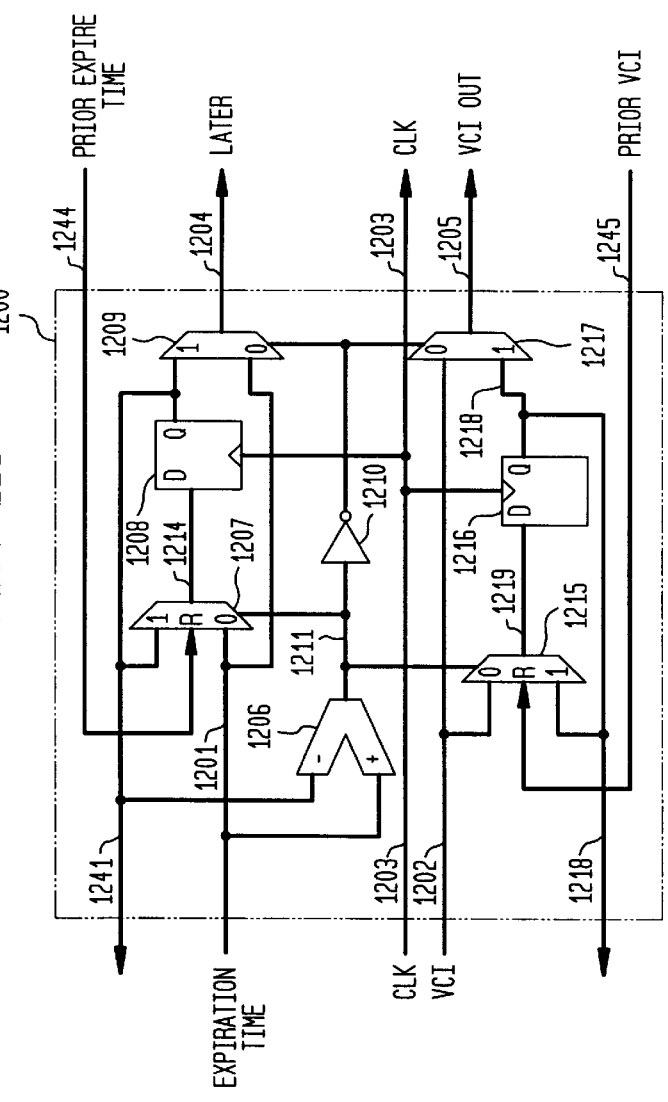
FIG. 12A
FIG. 12B

UNIFIED NETWORK CELL SCHEDULER AND FLOW CONTROLLER

CROSS REFERENCES

This application includes a microfiche appendix containing a detailed description of components used in one embodiment of the invention and standards reference information relevant to the field of the invention. This microfiche appendix is incorporated herein by reference.

FIELD OF THE INVENTION

This invention relates generally to the control of data flow within a communication network and particularly to the control of computer networks. More particularly, the invention relates to control of data connections and data flow according to Asynchronous Transfer Mode (ATM) specifications.

BACKGROUND OF THE INVENTION

In order to improve the communication and resource sharing between computer systems, data communication networks having network communication protocols were introduced. A communication network may be a local area network (LAN), a wide area network (WAN) or have the properties of both LAN and WAN. The physical transmission medium of a communication network may be a wired type or network such as copper wire, fibre optics, or coaxial cable or a wireless type of network such as radio, infrared, or microwave. One of the first LAN computer system networks was Ethernet (IEEE 802.3) which was introduced around 1982 having a bandwidth of about ten megabits per second. Another popular communication network was Token Ring (IEEE 802.5) which was introduced around 1985 with a bandwidth of around sixteen megabits per second. Around 1989 another LAN communication network system referred to as Fibre Distributed Digital Interface (FDDI) was introduced which used two optical fibers one to receive and one to transmit such that a bandwidth of one hundred megabits per second could be attained.

While LAN usually provided a means for computers and computer peripherals to communicate within a centrally located cite, a WAN provided a means for communication between users or two LANs that were physically separated. Around 1976 the X.21/X.25 communication standard was introduced for digital data transmission for WANS. In 1984 the Integrated Services Digital Network (ISDN) was introduced to allow the simultaneous communication of both speech and digital data over a WAN with about sixty-four kilobit per second bandwidth. Around 1991 Frame Relay was introduced and in 1993 Metropolitan Area Networks (MAN) were introduced which provided more that two megabit per second bandwidth.

As computer systems started to utilize more graphic images and video conferencing became more desirable, the communication of video data has become important over both LANs and WANs. While separate means for communication of video between end users could have been developed, it is desirable to simultaneously communicate video data, audio data, and digital data across a LAN and a WAN. Asynchronous Transfer Mode (ATM) for LAN and Broadband Integrated Services Digital Network (B-ISDN) for WAN communication was introduced around 1992. B-ISDN is based on ATM such that there is great similarity in LAN and WAN communication when both are using ATM standards of communication. The ATM standards for communication have been established by the ATM Forum. Of particular interest is the "ATM User-Network Interface Specification, Version 3.1, September, 1994" by the ATM Forum which specifies both the physical requirements (Physical Layer) for the ATM network and the electrical or signaling requirements for the ATM network (ATM Layer, Interim Local Management Interface, User-Network Interface Signalling).

FIG. 1 illustrates an example of an ATM network. The basis of the ATM network is the network element (NE) 100 which provides for communication amongst the end systems (ES1A–ESnA) 102a–102n and the end systems (ES1B–ESnB) 106a–106n. Network element 100 may be a private network ATM switch, public network ATM switch, a crossconnect, or an intermediate system such as a relay. The end systems (ES1A–ESnA) 102a–102n and (ES1B–ESnB) 106a–106n may be a variety of devices including a computer, a server, a printer, a video conference system, an audio system, or any other peripheral or computer device with ATM interface capability that desires to communicate or receive information over the ATM network.

The type of communication over the ATM network includes point to point, point to multipoint, multipoint to point, and multipoint to multipoint. An example of point to point is the communication of end system ES1A 102a to end system ES1B 106a. An example of point to multipoint is the communication of end system ES1A 102a to end systems ES1B through ESnB (106a–106n). An example of multipoint to multipoint is the communication of end systems ES1A through ESnA (102a–102n) to end systems ES1B through ESnB (106a–106n). Through a given ATM network the communication from one end system to another end system may have one or more logical paths in which a virtual connection could be made. The possible paths from one end system to another are referred to as the Virtual Paths (VP). Each virtual path may have one or more logical channels of communication which are referred to as Virtual Channels (VC). When a virtual channel is active it is often referred to as a virtual connection. Each VC has an associated identification number which is referred to as Virtual Channel Identifier (VCI). Each VP has an associated identification number which is referred to as Virtual Path Identifier (VPI).

ATM networks communicate using cell switching which is a form of Asynchronous time division multiplexing. The cells used in ATM are of a fixed length as opposed to packet switching which uses variable length data packets. In this manner a given ATM cell may be able to overtake a previously transmitted ATM cell and reach its destination sooner.

The ATM network architecture is organized as four independent communications layers which are based on the OSI reference model (CCITT X.200). Referring to FIG. 2A, these four layers are a physical layer 201, an ATM layer 202, an ATM Adaption Layer (AAL) 203, and Higher layers of applications 204. These four layers are linked together by three planes: a User Plane (not illustrated), a Control Plane 206, and a Management Plane 207. The ATM layer 202 specifies the transport mechanism that is used in the B-ISDN and ATM network.

Briefly, some of the various functions performed at each of the four layers is described. The physical layer 201 specifies the physical medium (PM) and transmission convergence (TC) where adaption to the transmission interface occurs. The physical medium considers the bit timing that is required and the type of connectors, cabling, impedances, and protocol used at the physical medium. At the ATM layer 202 generic flow control is considered, the cell header is generated or removed and passed to the respective next layer, the VPI/VCI address may be analyzed or translated and the ATM cells are multiplexed and demultiplexed as the case may be. At the ATM Adaption Layer 203 there is a segmentation and reassembly sublayer (SAR) and a Convergence Sublayer (CS). The convergence sublayer provides the adaption of the signal to the higher layer and its applications. The SAR sublayer provides for the segmentation of protocol data units (PDUs) into ATM cells or assembles ATM cells into PDUs that are passed to the higher layer.

Referring to FIG. 2B, the ATM layer 202 specifies the use of a fixed length ATM cell 210 or 220 to communicate over the physical layer 201. The ATM cell 210 is for communication over a User-to-Network Interface (UNI) while ATM cell 220 is for communication over a Network-to-Network Interface (NNI). ATM cell 210 consists of a Generic Flow Control (GFC) field 211, Virtual Path Identifier (VPI) field 212, Virtual Channel Identifier (VCI) field 213, Payload Type (PT) field 214, Cell Loss Priority (CLP) field 215, Header Error Control (HEC) field 216, and Cell Payload or data field 217. ATM cell 220 is similar to ATM cell 210 but eliminates the GFC field and increases the size of the VPI field 212. The ATM cell 210 and 220 are of fixed length and consists of fifty-three octets or four hundred and twenty-four bits of data.

The Generic Flow Control (GFC) field 211 consists of four bits and is used to control local functions such as access authority and the communication of ATM signals within a LAN. If the access is uncontrolled then the GFC field is logically set to all zeros. If the access is to be controlled then specific bits are set. The GFC information is not used by ATM switches and cross-connects which may overwrite these bits. The next two fields VPI 212 and VCI 213 provide the address information for the given cell payload 217. The Virtual Path Identifier (VPI) 212 identifies the path while the Virtual Channel Identifier (VCI) 213 identifies the channel that is to be used within the identified path. Payload Type (PT) field 214 is 3 bits long and identifies the type of Cell Payload whether it is a user type cell or a system type cell or some other reserved type cell. Cell Loss Priority (CLP) field 215 is a one bit field which allows for cells with higher communication priority to be separated from cells with lower communication priority. If the CLP field is set to logical one, the ATM cell is assigned to a low priority. If the CLP is set to logical zero, the ATM cell is given high priority. Cells with lower priority are discarded first if transmission capacity is exceeded. Header Error Control (HEC) field 216, an eight bit field, is an error control field and provides for detection and synchronization for the start of the Cell Payload 217.

An ATM cell may also be categorized as an Idle cell, unassigned cell, physical layer Operation and Maintenance (OAM) cell, VP/VC cell which is more commonly referred to as a data cell, or a VP/VC OAM cell. Idle cells allow the cell rate to be adjusted to the transfer medium bandwidth. Unassigned cells are cells that have a VPI or VCI value but the cell payload is blank. Physical Layer OAM cells (PLOAM) are used to transfer information concerning the physical layer. VP/VC cells are the cells used for transferring information including user data. VP/VC OAM cells allow the performance and availability of virtual paths and virtual channels to be monitored and tested.

There are four service classes for B-ISDN that specify different classes of traffic that is expected across a network. There is Service class A, Service Class B, Service Class C and Service class D. Service class A is a connection oriented service class that has a constant bit rate (CBR) and is usually for video. Service class B is a connection oriented service class which has a variable bit rate (VBR). Service class C is a connection oriented service class for bursty data services and has a variable bit rate. Service class D is a connectionless service and has a variable bit rate (VBR).

At the ATM layer, five service categories have recently been specified by the ATM forum in the "Traffic Management Specification, Version 4, ATM Forum/95-013R10, February 1996" which is attached hereto as part of the microfiche appendix and is incorporated herein by reference. These are Constant Bit Rate (CBR), Real-Time Variable Bit Rate (rt-VBR) and Non-Real-Time Variable Bit Rate (nrt-VBR) which may be collectively referred to as Variable Bit Rate, Unspecified Bit Rate (UBR), and Available Bit Rate (ABR). While CBR and VBR have previously been specified, ABR and UBR are new additions to the ATM specification. These various type of services may generate different ATM cell traffic across a path and channel. The different kind of data that needs transmitting across a network require different kinds of service classes.

For each of these different service classes there is defined a "Quality of Service" (QOS) that should be provided by any end system 102a and any network element 100. The ATM specification defines seven cell transfer performance parameters. These are cell error rate, serious cell block errors, cell misinsertion rate, mean cell transfer delay, cell loss rate, cell delay and cell delay variation. Of these, the cell loss rate, cell delay and cell delay variation are used as QOS parameters. The QOS parameters may vary with the class of service provided. In order to satisfy QOS parameters, traffic congestion must be properly managed. Traffic congestion occurs in a network because the various sources desiring to transmit ATM cells are all competing for the same time slot and there is just not enough capacity within the network to allow all sources to transmit within the time slot. Often times a network element 100, such as an ATM switch has an insufficient amount of storage capacity such that the ATM cells tend to get into a traffic jam at the ATM switch. It is desirable to properly manage the scheduling of ATM cells such that traffic congestion is reduced.

FIG. 3 illustrates constant bit rate ATM cell traffic for a given path and channel. The various end systems having a virtual connection and similar virtual channel compete for time slots within the given channel. End system 1A (ES1) 102a is transmitting a video data (V) across the network. Every third ATM cell (301, 304, 307, 310) is a video cell that requires a fairly high constant bit rate. End system 2A (ES2) is communicating digital data (D) of some sort such that each sixth ATM cell (302, 308) is a digital data cell. The digital data is transmitted at a constant bit rate. End System 3A (ES3) is transmitting audio data (A) such as a telephone call across the network at a constant bit rate so that each eighth cell (303, 311) is an audio ATM cell. This is a lower constant bit rate than that of video. To maintain the bandwidth of the channel, Idle ATM cells (305, 306, 309) were inserted into the data stream. This maintains the proper bandwidth of the channel but loses some efficiency in data transfer rate. Variable bit rate causes the data transfer rate for a given virtual path and virtual channel to change. Thus the number of cells that require being sent varies as the bit rate varies.

FIG. 4 illustrates end system 102a supporting CBR and VBR. Within the end system 102a is a network interface card (NIC) 401. NIC 401 plugs into the PCI Bus 402 within the end system 102a. NIC 401 communicates to the ATM network over a receive connection 404 and a transmit connection 406. The receive connection 404 may be a fibre optic cable or a twisted pair copper lines satisfying the necessary ATM specification. The transmit connection 406 may be a fibre optic cable or a twisted pair copper lines satisfying the necessary ATM specification. NIC 401 includes a segmentation and reassembly controller (SRC) 410 coupled to the PCI bus 402, an ATM Receiver/Transmitter 412 coupled to the SRC 410, and memory 414 coupled to the SRC 410. Optionally the NIC 401 may include a microprocessor 416 coupled to the memory 414, SRC 410 and the ATM Receiver/Transmitter 412, and a second memory 418 coupled to and for controlling the microprocessor 416. Across the PCI bus 402, NIC 401 transmits from and receives information for the end system 102a. Additionally the NIC 401 may be part of the path and channel for other end systems such that the NIC 401 would receive information from another end system by the receive connection 404 and retransmit the information out by the transmit connection 406.

FIG. 5 illustrates how the SRC 410 schedules constant bit rate ATM cell traffic. SRC 410 stores within memory 414 in a linear fashion, the scheduled VPI and VCI address information indicating the virtual path and virtual channel for the ATM cell payload that is to be transmitted at a particular time. This is analogous to a trains schedule which is fixed or static. Static schedule requires the external microprocessor 416 to update the scheduling within the memory 414. SRC 410 addresses memory 414 in a linear and circular fashion as indicated by the circular arrow 500. SRC 410 first obtains the VCI for ES1 501 that correlates with the video data of ATM cell 301 in FIG. 3. Next the VCI for ES2 502 is accessed in order to select the digital data ATM cell 302. Then the VCI for ES3 503 is accessed in order that the audio data ATM cell 303 is transmitted. Then, the VCI for ES1 is once again selected by reading the next address location and the next video data ATM cell for ES1 may be transmitted. Next, the VCI 505 for the first Idle cell 305 is selected and then the VCI 506 for the second Idle cell 306 may be selected. The next address selects the VCI 507 for ES1 that correlates with the transmission of the video ATM cell 307. In the case of constant bit rate traffic the addressing of memory 414 has a one to one mapping with the ATM cells being transmitted. In the case of variable bit rate traffic, the number of address locations for a give virtual channel and end system is increased or decreased within memory 414 while the linear addressing continues.

Available bit rate service specifies that the bit rate that is available be used so that adjustments be made in the transmission of ATM cells. FIG. 6 illustrates an example of available bit rate service for the video ATM cells being transmitted by ES1. Video ATM cells 605, 606, and 609 have replaced the idle ATM cells 305, 306, and 309 for the constant bit rate example of FIG. 3. Previously software had been used to control the traffic of available bit rate service. However software solutions for traffic control of ATM cells have not been able to support bandwidths much greater than 155 megabits per second. Computations at this rate must be performed in one ATM cell time or approximately 2.6 microseconds. In the near future it is expected that the bandwidth will increase to around 622 megabits per second in which case software solutions will be unavailable. It is desirable to have a single chip provide hardware control for ATM cell traffic flows for the various services.

BRIEF SUMMARY OF THE INVENTION

The present invention includes a method and apparatus for prioritizing and scheduling ATM cells that are competing for a given time slot for transmission onto a network. A segmentation and reassembly controller establishes a data structure within a memory. The preferable data structure includes a virtual connection time table and a virtual connection parameter table that use linked lists to index to one another. The segmentation and reassembly (SAR) controller includes a sorter for determining the priority of the ATM cells and selecting one for a given time slot and a microcode engine to compute next scheduled time slot and adjust the virtual connection parameter table for a given virtual connection. Coupled to the microcode engine is a random access memory for storing microcode programs so that the SAR may be programmed to prioritize and schedule in a different manner.

It is an object of the present invention to prioritize and schedule ATM cells for the various virtual connections in a unified manner using a single controller integrated circuit and an external memory so that system costs may be lower.

Another object of the present invention is to prioritize and schedule ATM cells more quickly such that greater bandwidths within a channel may be supported.

A still further object of the present invention is to provide a variable data structure to perform the prioritization and scheduling of ATM cells without changing or using additional hardware.

These and other objects and advantages of the present invention will no doubt become obvious to those of ordinary skill in the art after having read the following detailed description of the preferred embodiments which are illustrated in the various drawing figures.

BRIEF DESCRIPTIONS OF THE DRAWINGS

FIG. 3 is a diagram illustrating an example of constant bit rate service and the scheduling of ATM cells.

FIG. 6 is a diagram illustrating an example of the scheduling of ATM cells for end system two and end system three communicating using a constant bit rate service while end system one communicates using an available bit rate service.

FIG. 7B is a table of ABR parameters specified by the ATM specification.

FIG. 7C is a first table that illustrating the parameters stored into the VC Parameter Table.

FIG. 7D is a second table illustrating additional parameters that are stored into the VC Parameter Table.

FIG. 11 is a table of the fields included within a rate management ATM cell.

FIG. 12A is a block diagram of the preferred embodiment of a hardware sorter.

FIG. 12B is a detailed block diagram of one stage of the sorter illustrated by FIG. 12A.

DETAILED DESCRIPTION OF THE PREFERRED EMBODIMENT

The present invention includes a method and apparatus for ATM cell scheduling and traffic control in order to support the various types of traffic in a unified manner with a minimal amount of hardware and maximum utilization of channel bandwidth. The scheduling and flow control provided by the present invention evens out the flow of the various types of ATM cell traffic to minimize cell traffic congestion. The present invention sorts the priority of the virtual channels and flexibly schedules the ATM cells for the virtual channels by using linked lists. When ATM cells from different virtual channels compete for the same time slot, the ATM cell selected and scheduled for transmission is determined by analyzing the traffic type and the virtual connection parameters that are stored in memory. For available bit rate service, the present invention monitors the scheduling of ATM cells and adjusts the priority of the virtual channels accordingly by updating the linked lists.

Figure 1:
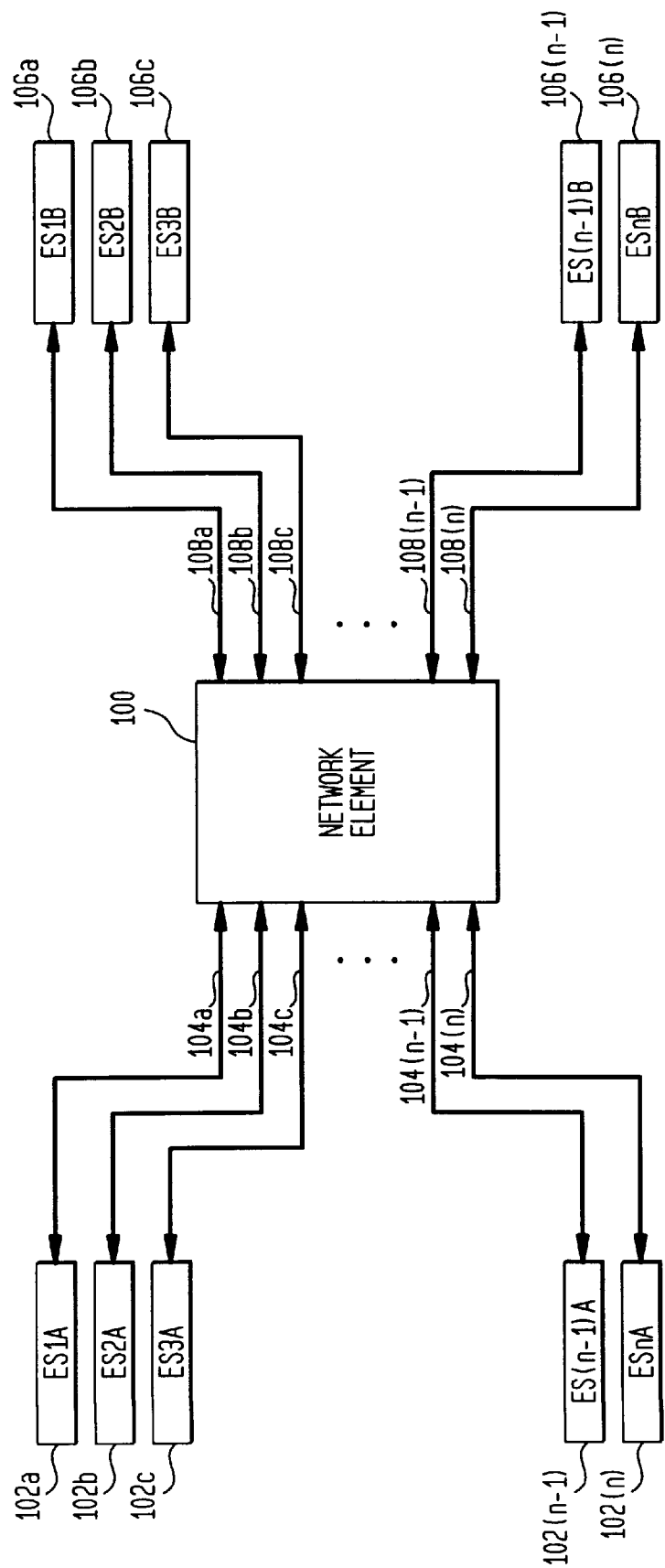
FIG. 1 is a block diagram of an asynchronous transfer mode (ATM) network.
Figure 2A:
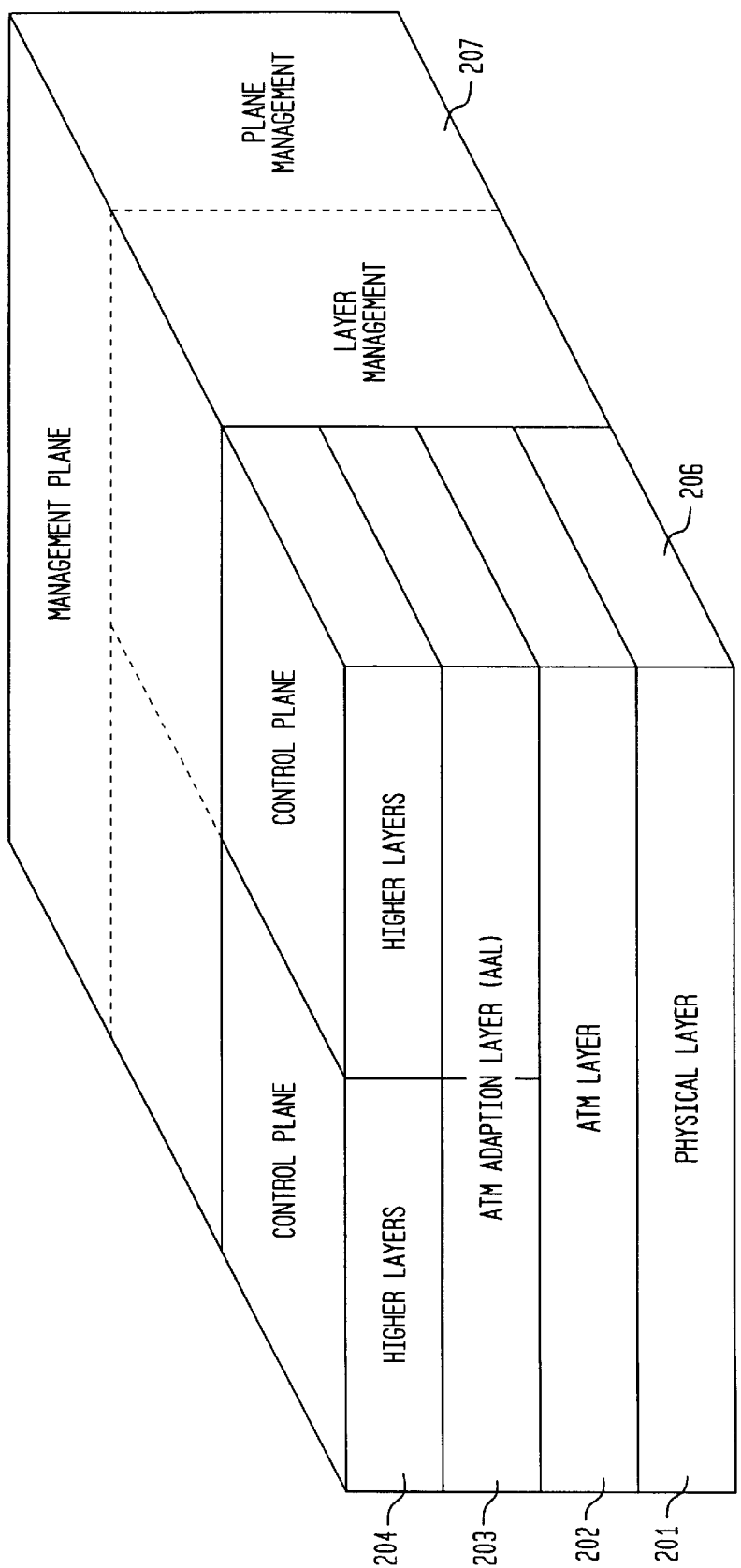
FIG. 2A is a diagram of the layers associated with an ATM communication system.
Figure 2B:
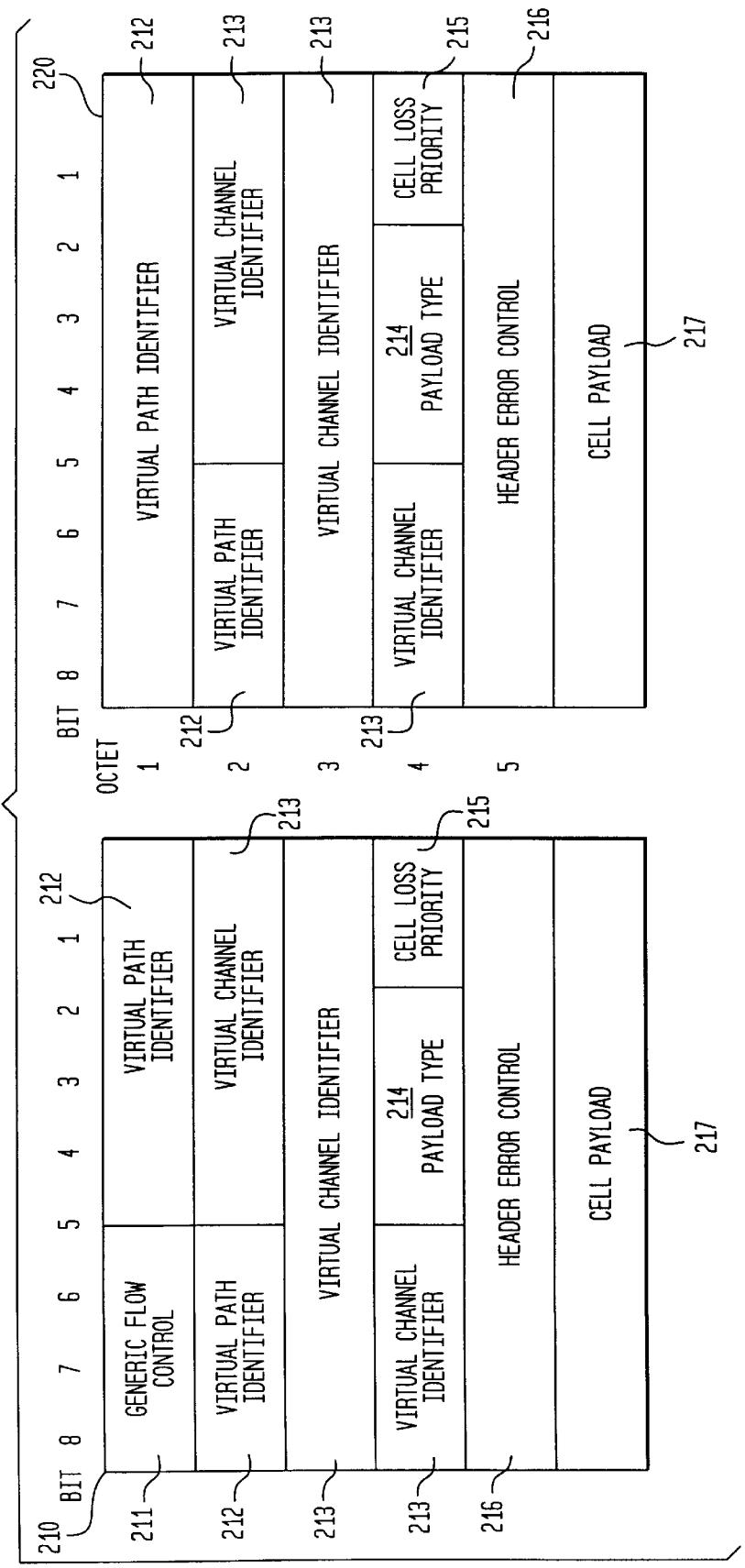
FIG. 2B is a diagram of the data fields within a user-network interface ATM cell and a network-network interface ATM cell.
Figure 4:
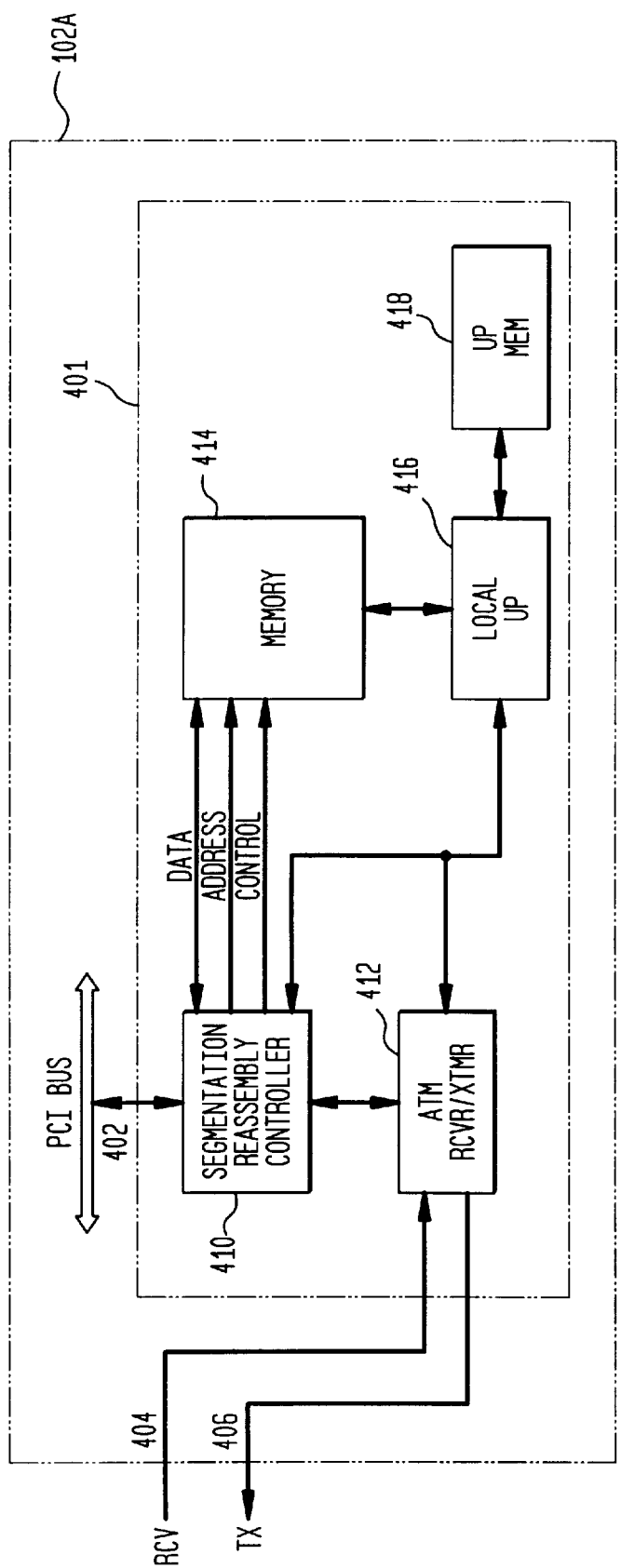
FIG. 4 is a block diagram of prior art end system with a network interface card which includes a prior art segmentation and reassembly controller.
Figure 5:
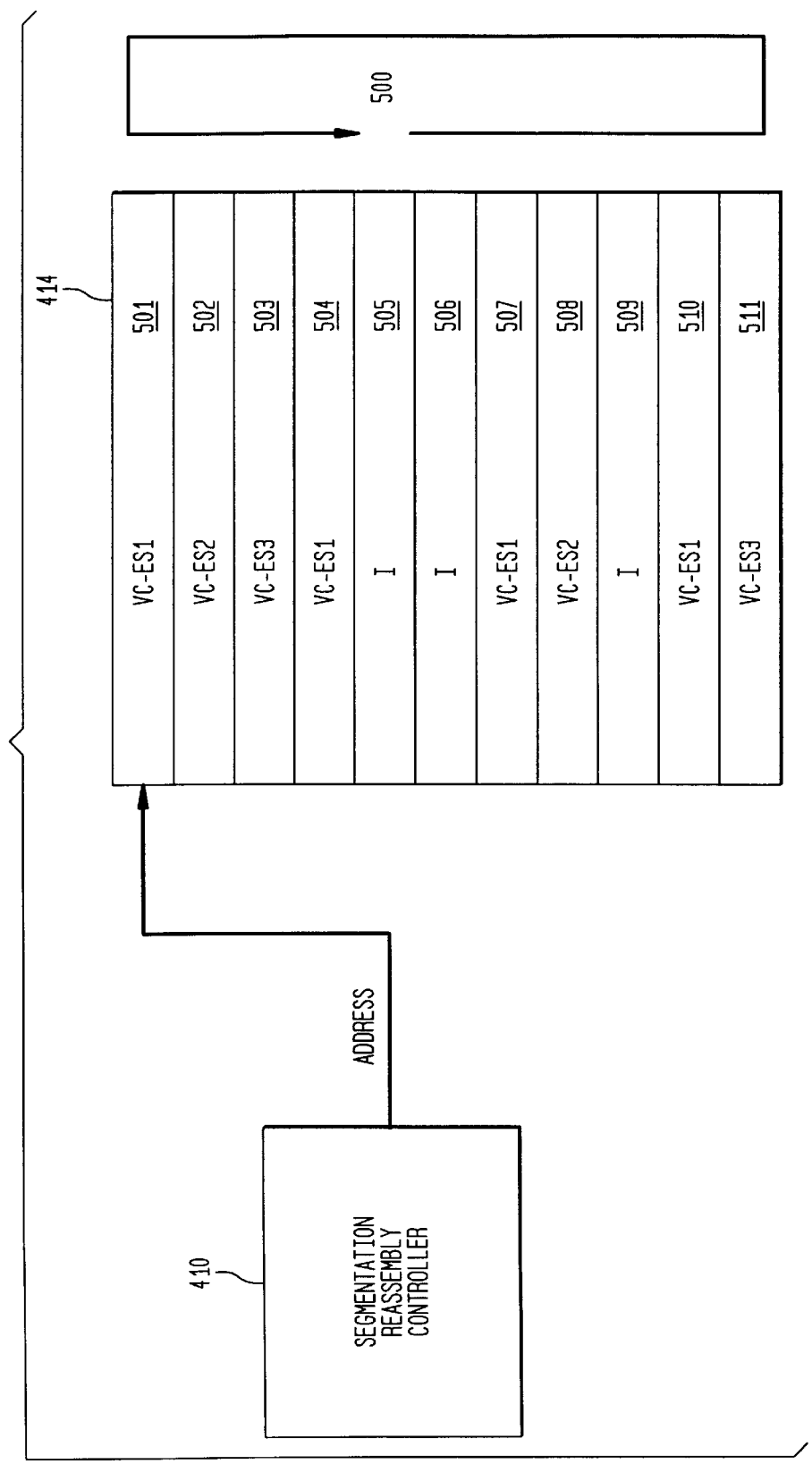
FIG. 5 is a diagram illustrating the prior art method of scheduling ATM cells in accordance with FIG. 3.
Figure 7A:
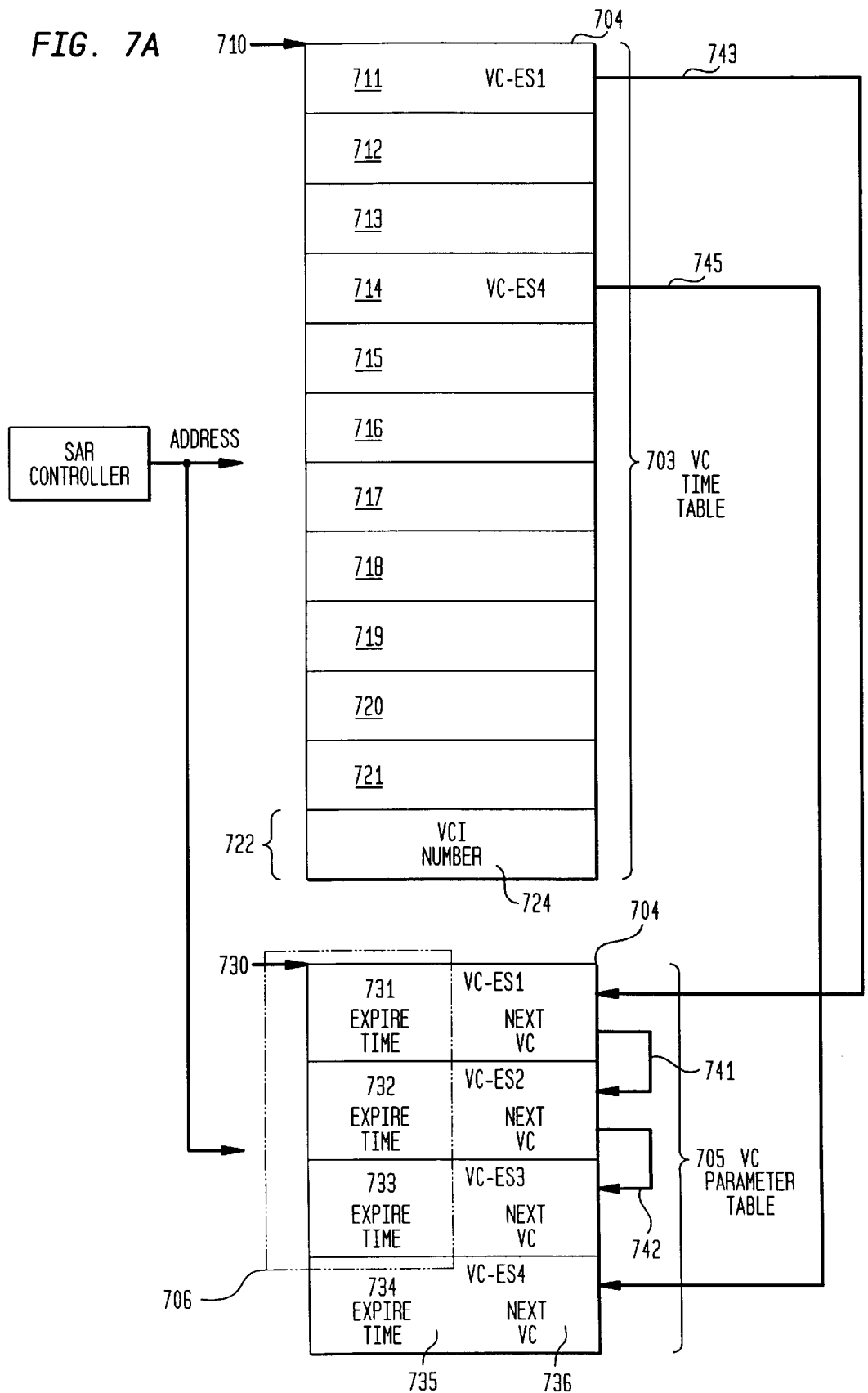
FIG. 7A is a diagram illustrating the basic method of scheduling provided by the present invention.

Referring to FIG. 7A, a segmentation and reassembly (SAR) controller 702 addresses a partition of memory locations 711–722 within a memory 704. The partition of memory locations 711–722 is referred to as a VC Time Table 703 and is somewhat analogous to a taxi cabs schedule. That is, at a given moment in time the current priority and schedule of ATM cells is known but in the future, the priority and schedule of ATM cells is unknown because certain events may change them such as traffic congestion. The VC Time Table is also somewhat analogous to what is known as a calendar queue. Each memory location 711–722 represents a maturation time 723 and may contain a VCI number 724 which represents an ATM cell for the given virtual connection. The VC Time Table starts at a VC Time Table base address 710. The address for memory locations 711–722 corresponds with increasing Maturation Time. Maturation Time indicates the earliest time that the given ATM cell is desired to be scheduled.

Within memory 704 is a second partition of memory locations 731–734 which is referred to as a VC Parameter Table 705. The VC Parameter Table 705 stores the parameters for each active virtual connection. The VC Time Table 703 is linked to the VC Parameter Table 705 through the VCI number 724 stored in the VC Time Table. For example entry 711 has a link 743 pointing to VC-ES1 731 and entry 714 has a link 745 pointing to VC-ES4 734. The VCI number 724 can be converted into an address that points to the proper entry in the VC parameter table. Preferably the VCI number is multiplied by sixteen by shifting the bits of the VCI number four places to the left and adding a VC parameter base address 730. Within the stored parameters of each virtual connection in the VC Parameter Table 705 is an Expiration Time 735 and a Next VCI address 736. Expiration time is also referred to as a deadline and indicates the latest time that a given ATM cell should be scheduled without violating the virtual connections service contract. The Next VCI address field 736 indicates the address in the VC Parameter Table 705 for the next virtual connection with the same maturation time. For example VC-ES1 731 has a link 741 pointing to VC-ES2 732 and similarly VC-ES2 has a link 742 pointing to VC-ES3 733. This implies that VC-ES1, VC-ES2 and VC-ES3 all mature at the same time. When no more virtual connections have the same maturation time, the VCI field is set to a reserved (null) value. For example 712 through 713 and 715 through 721 are null entries and VC-ES3 has a null Next VC 736 value.

In the preferred embodiment, no ATM cell for a given virtual connection is prioritized or scheduled until its maturation time has been reached. A counter within the SAR controller 702 keeps track of the current time of the transmission slot. Once the current time surpasses the maturity time 723 for an entry in the VC Time Table 703, the ATM cell represented by that mature entry may be prioritized and scheduled by the SAR 702 for transmission out onto the network.

In prioritizing ATM cells based on expiration time, a sliding sort window 706 is effectively generated by the linked lists 741 and 742 such that the expiration time stored within a number of memory locations of the VC parameter table 705 may be read by the SAR controller 702 and then sorted and prioritized by analyzing the expiration time of the selected virtual connections. Usually, the virtual connection with the smallest expiration time has the highest priority for transmission. The sliding sort window 706 may sort a plurality of virtual connections at one time but preferably sorts sixteen virtual connections at a time. Sliding sort window 706 as illustrated in FIG. 7A is sorting on only three expiration times. After sorting and prioritizing, the linked lists of the two tables are updated due to changes in priority.

The linked lists for the tables provide for the scheduling of the ATM cells and may be adjusted for the type of service that a virtual channel or virtual connection requests. For example, assume that the scheduling of ATM cells for VC-ES1 is for an available bit rate service (ABR) while the scheduling of ATM cells for VC-ES2 and VC-ES3 are for a constant bit rate (CBR) service. When VC-ES1 requests ABR service, additional ATM cells for this virtual connection may be transmitted over the network in place of any Idle ATM cells. Comparing FIG. 3 with FIG. 6 illustrates the efficiency provided by ABR. Previously, Idle ATM cells 305, 306, and 309 were added to the ATM cell stream of FIG. 3 when VC-ES1 required a CBR. Linked lists modified for ABR by the SAR 702 allow the ATM cells of VC-ES1 to be transmitted across the ATM network as illustrated by ATM cells 605, 606, and 609 in the ATM cell stream of FIG. 6. While linked lists are preferably used to prioritize and schedule ATM cells, other data structures may be used to organize the data within memory 704 to prioritize and schedule ATM cells, such as binary trees and circulation queues.

FIG. 7B illustrates the parameters provided by each virtual connection requesting ABR service upon the signalling phase of the connection initiation. CBR, VBR and UBR connections do not provide these parameters. For CBR and VBR connections Peak Cell Rate (PCR) and Cell Delay Variation Tollerance (CDVT) are provided during signalling. For UBR connections a PCR is provided but not a CDVT. In addition, for VBR connections a Sustainable Cell Rate (SCR) is provided during signalling. SAR 702 converts most of the rate values provided by the virtual connection into time values or periods by inverting the provided value.

Figures 7E, 7F:
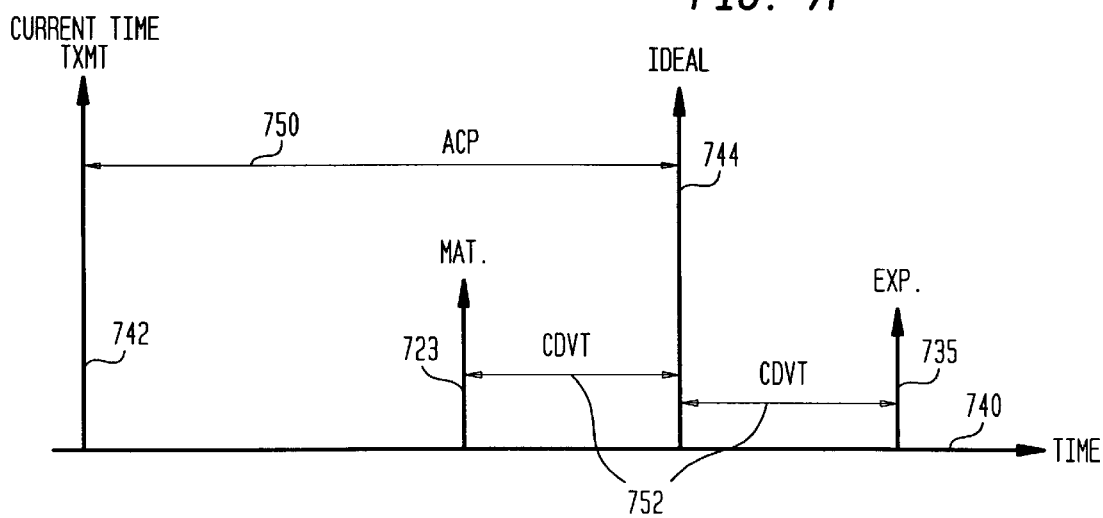
FIG. 7E is a diagram illustrating how the VC parameters for a given virtual connection are stored into the VC Parameter Table.
FIG. 7F is a time line illustrating the definition of mature time and expiration time or deadline time for a given ATM cell.

FIG. 7C and FIG. 7D lists the rate values that were converted to periods and other virtual connection parameters that may be computed by the SAR and maintained for each active virtual connection within the VC Parameter Table 705. FIG. 7E illustrates the preferred arrangement of the virtual connection parameters that are stored in the VC Parameter Table for each active connection.

FIG. 7F illustrates how the Maturation Time 723 and Expiration time 735 are computed by the SAR 702. SAR 702 by means of a counter keeps track of the current time 742 along the timeline 740. The parameter Allowed Cell Period (ACP) 750 is the inverse of the Allowed Cell Rate (ACR) parameter that is provided by each virtual connection upon the signalling phase. The Cell Delay Variation Time (CDVT) 752 is a QOS measurement which is specified by the ATM specification for the selected service. The value ACP 750 is added to the current time 742 to obtain the Ideal Scheduled time 744. Subtracting the value of CDVT 752 from the Ideal Scheduled time 744 generates the value for the Maturation Time 723. Adding the value of CDVT 752 to the Ideal Scheduled time 744 generates the value for the Expiration Time 735.

Figure 8:
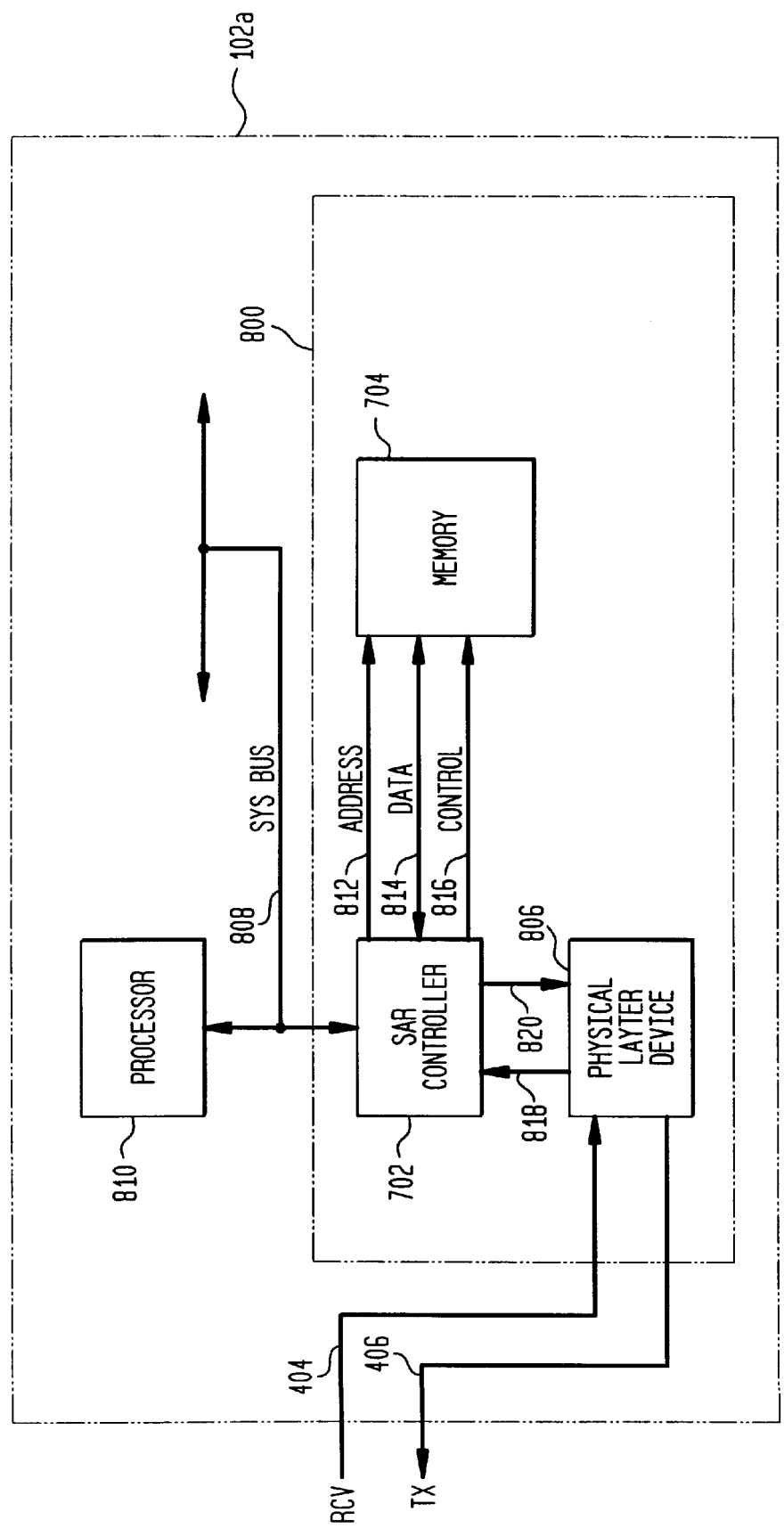
FIG. 8 is a block diagram illustrating an end system with a network interface card including the ATM segmentation and reassembly (SAR) controller of the present invention.

FIG. 8 illustrates an end system 102a that includes a network interface card (NIC) 800. Network interface card 800 includes a segmentation and reassembly (SAR) controller 702, memory 704, and a physical layer device 806. The SAR controller 702 is coupled to a system bus 808, the memory 704, and the physical layer device 806. Through the system bus 808 the SAR may communicate with a host processor 810 or other devices connected to the system bus 808. The system bus 808 is preferably a PCI bus. SAR controller 702 communicates with the memory 704 by means of the address 812, data 814 and control lines 816. SAR controller 702 communicates with the physical layer device by means of UTOPIA (Universal Test and Operations Physical Interface for ATM) input lines 818 and UTOPIA output lines 820. The physical layer device may communicate with the network by means of the receive connection 404 and the transmit connection 406. The receive connection 404 and the transmit connection 406 may be a fibre optic cable, twisted pair copper lines, or some other connection that satisfies the necessary ATM or other network specification. The physical layer device converts signals received from the physical network into UTOPIA input signals for the SAR controller 702. The physical layer device also converts UTOPIA output signals received from the SAR controller 702 into signals that may be transmitted over the physical network. In the network element 100, one or more network interface cards 800 may be used therein to provide additional virtual path and virtual channel capacity by plugging additional network interface cards 800 into the system bus 808.

Figure 9:
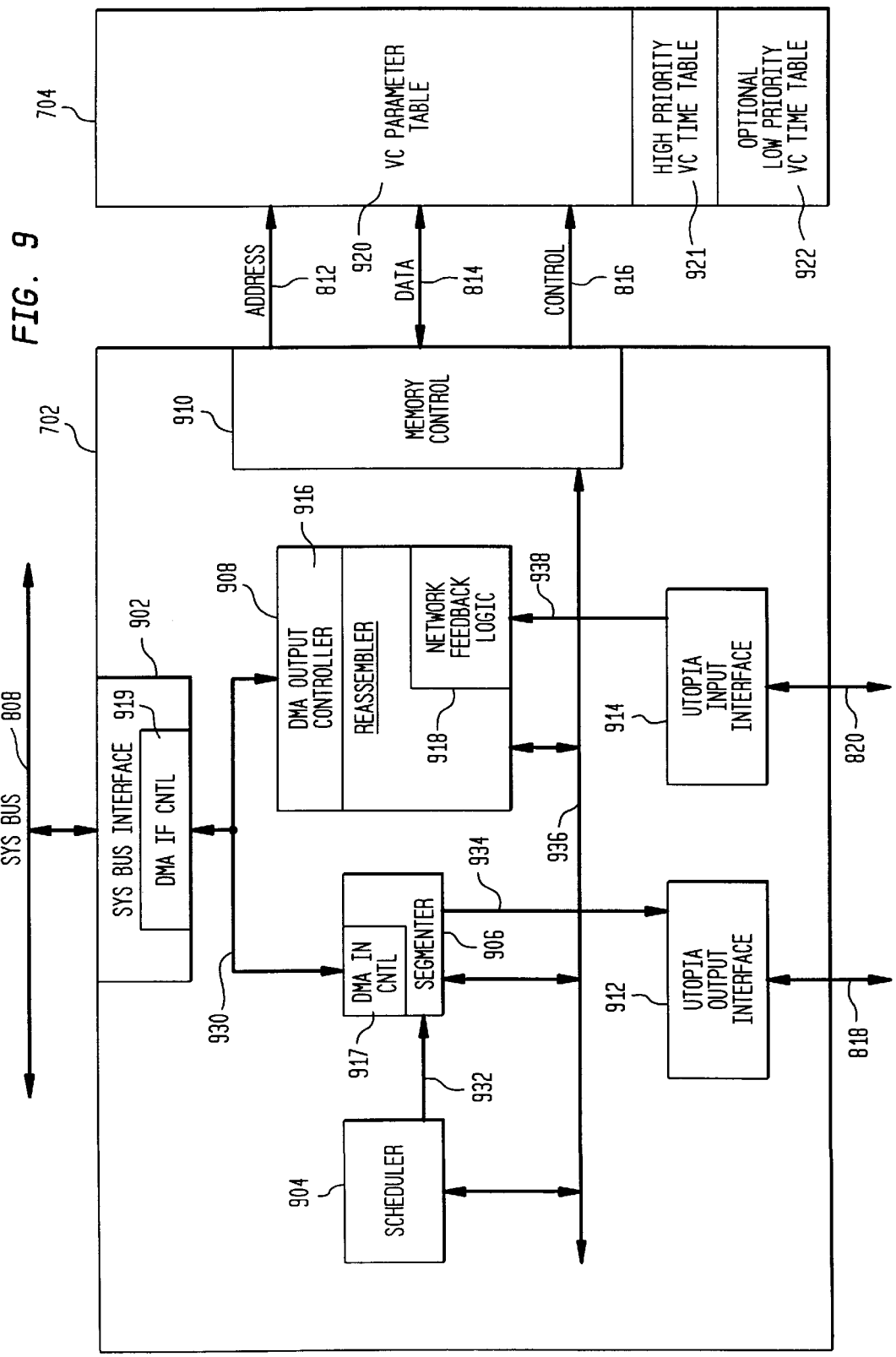
FIG. 9 is a block diagram of a network interface card which includes the ATM SAR controller of the present invention.

FIG. 9 illustrates a detailed block diagram of the SAR controller 702 and the contents stored in memory 704 in accordance with the preferred embodiment of the present invention. SAR controller 702 includes a system bus interface 902, a scheduler 904, a segmenter 906, a reassembler 908, memory controller 910, a UTOPIA output interface 912, and a UTOPIA input interface 914. The system bus interface 902 allows for communication between the SAR controller and other devices on the system bus 808 including the host processor 810. The system bus interface 902 is preferably a PCI bus interface and may include a DMA interface controller 919. The scheduler 904 includes one or more sorters and memory for storing microcode that controls the operation of the SAR controller 702. The microcode is stored into the memory within the scheduler 904 upon initialization of the network interface controller 702. The microcode controls the functionality of the sorters including what parameters are used to perform the sort and in what manner the sorting is to be performed. The segmenter 906 converts the user data or information from the applications layer and segments it into forty-eight octets for the cell payload 217 and adds the header information 211–216 of the ATM cell including the VPI 212 and VCI 213. Segmenter 906 may include a DMA input controller 917 for handling the data received by the DMA interface controller 919 of the system bus interface 902. The reassembler 908 receives the ATM cells from the network and strips away the header information and stores it in memory 704 and reassembles the cell payload 217 of one or more ATM cells into user data or information for use in the applications layer. The reassembler includes a DMA output controller 916 and network feedback logic 918. The DMA output controller 916 consists of the output logical portion of the typical DMA controller and allows the SAR controller 702 to directly write data onto the system bus 808 and into system memory (not illustrated). Memory controller 910 generates the appropriate control and address signals for the control lines 816 and address lines 812 and reads or writes data from/to the memory 704. The UTOPIA output interface 912 has a FIFO output buffer and generates handshaking signals in order to control the output of ATM cells from the SAR controller 702 to the physical layer device 806. The UTOPIA input interface 914 has a FIFO input buffer and generates handshaking signals in order to control the input of ATM cells into the SAR controller 702 from the physical layer device 806.

Memory 704 may be partitioned by the microcode within the scheduler 904 into functional areas. Preferably the memory 704 will include memory partitions for a VC Parameter Table 920 and a VC Time Table 921. An additional memory partition may be created for a second VC Time Table 922 of lower priority then the first VC Time Table 921. The values stored in the VC Time Tables are used to prioritize and schedule the ATM cells that need to be scheduled. If there is no traffic congestion then there may be no ATM cells requiring scheduling and thus no entry in the VC Time Table. Preferably the values stored in the VC Time Tables are the time values referred to as expiration time 735 and maturation time. The ATM cells entered into the VC Time Table are listed by maturation time 723. Once the maturation time 723 has been reached the ATM cell may be sorted and scheduled for transmission. Expiration time 735, also referred to as deadline, is the latest time that an ATM cell may be scheduled for transmission without violating a QOS parameter. The initial maturation times 723 for ATM cells may be determined from the Initial Cell Rate or period, which is initially used to establish the actual cell rate or period. The expiration time 735 for ATM cells may be determined from the Minimum Cell Rate and the Cell Delay Variation Tolerance (CDVT) as previously describe with reference to FIG. 7F.

The parameters listed in FIG. 7C and FIG. 7D are maintained for each active virtual connection within the VC Parameter Table 920. The type of parameters stored for an active connection depend upon the type of service requested by that connection. A channel may request CBR, VBR, ABR, or UBR service such that 64 bytes of data may be stored for a given channel. Preferably the VC Parameter Table can store the parameters for 65536 channels but may be increased in size to store parameters for the ATM maximum number of channels.

The operation of the SAR controller 702 and memory 704 are further described in the paper entitled "DESIGN OF ATM ADAPTION LAYER-5 SEGMENTATION AND REASSEMBLY UNIT (AAL-5 SAR)" by Andan Sazli and Jay Sethuram a copy of which is attached hereto as part of the microfiche appendix.

Figure 10:
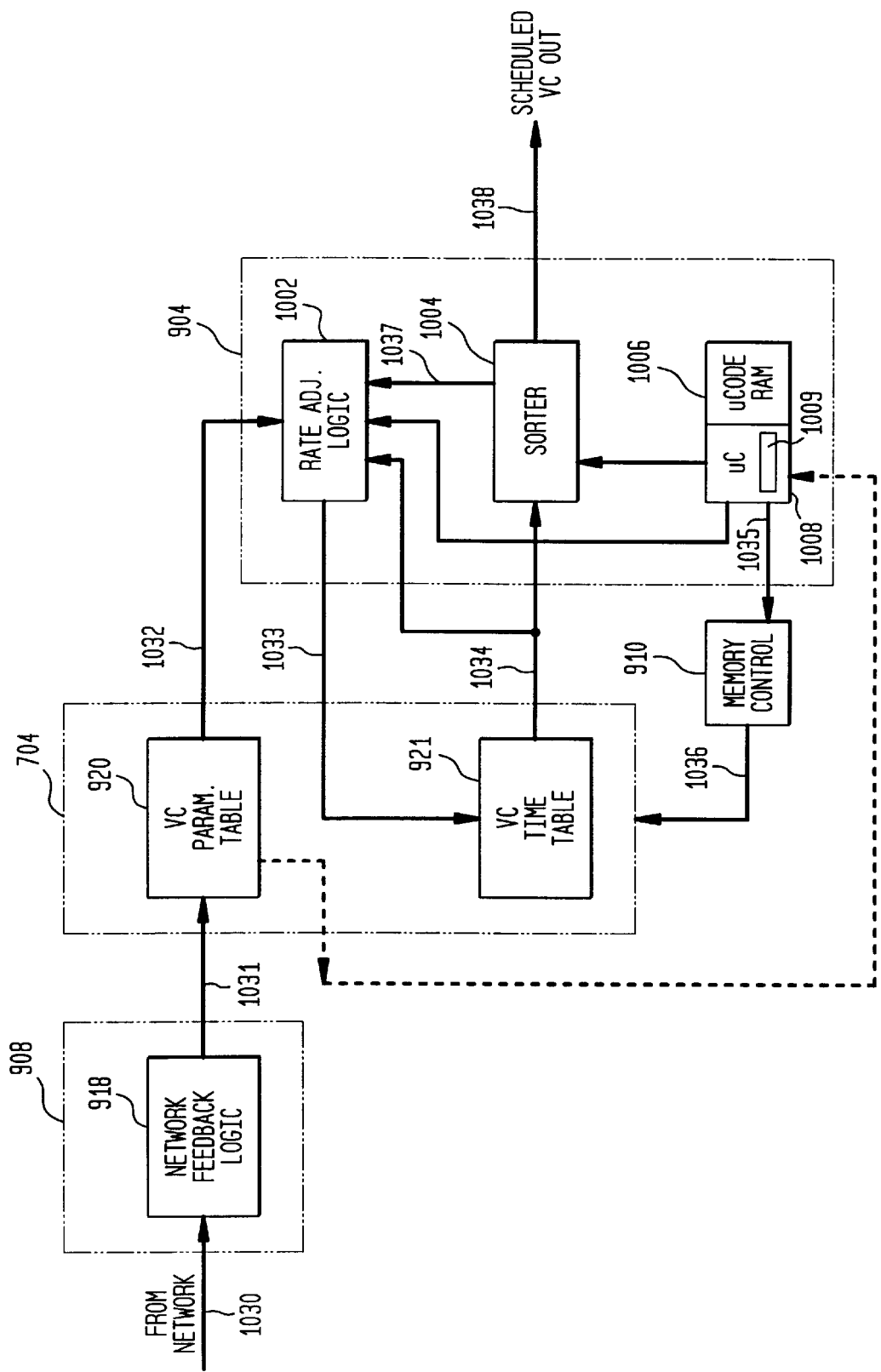
FIG. 10 is a diagram illustrating the functionality of the ATM segmentation and reassembly controller supporting available bit rate service.

FIG. 10 illustrates the operation and components of the SAR controller 702 and memory 704 that perform traffic control and scheduling of ATM cells for CBR, VBR and ABR type of ATM cell traffic. The scheduler 904 can schedule ATM cells for virtual connections with the various available service types including CBR, VBR, ABR and UBR. Microcode stored in a RAM 1006 causes a microcode engine 1008 to control the prioritization and scheduling of ATM cells. Included within the microcode engine 1008 is a counter 1009 to keep track of the current time of the transmitting cell slot. The scheduling and prioritization of ATM cells may be referred to as flow control. The microcode allows for differing types or combinations of flow control. In the preferred embodiment the type of flow control provided is a rate based flow control. A credit based type of flow control, analogous to a smart card, where a given virtual connection has permission to consecutively send a number of ATM cells may alternatively be used.

A type of ATM cell that is used to determine the available capacity of a network is a rate management (RM) cell. FIG. 11 illustrates the fields within an RM cell. When viewed from a given source of ATM cells, an RM cell is a forward RM cell (fRM) if transmitted by the given source. When an RM cell is received by a given network element or end system, the RM cell is a backward RM cell (bRM). DIR field indicates whether an RM cell is a forward (logical zero) or backward (logical one) RM cell. Each end system and network element is required to periodically transmit forward RM cells for each active ABR channel. The period of forward RM cell transmission varies but one is usually transmitted after thirty-two ATM cells have been transmitted by the given network element or end system. An RM cell may be recognized because its payload type indicator (PTI) has a binary value of 110.

Network Feedback logic 918 within the reassembler analyzes the traffic on the network, determines the available cell rate and causes a change to the parameters stored in the VC parameter table 920 of memory 704. Network Feedback Logic 918 may determine the ATM cell rate for a given virtual connection, convert it into period information and store it into the VC Parameter Table 920. Adjustments to parameters in the VC parameter table may cause changes to the data in a VC time table 921 or 922. Changes in a VC Time Table 921 or 922 may cause changes to the sorting and prioritization of the scheduling of ATM cell transmission. Adjustments to parameters in the VC parameter table are usually only made for Virtual Connections having an ABR or UBR type of service. Network Feedback Logic 918 additionally extracts three fields from each RM cell that is received. The extracted fields are NI, CI, and ER. CI is a congestion indicator and is used to cause the source to decrease its allowed cell rate (ACR). NI is the No Increase bit and is used to prevent a source of ATM cells from increasing its allowed cell rate. ER is the Explicit Cell Rate and is used to limit a sources allowed cell rate to its specific value. If CI is true then the transmission rate ACR of the given end system or network element is decreased by the Rate Decrease Factor (RDF). If CI is false and NI is false then the transmission rate ACR is increased by the Rate Increase Factor (RIF). The revised transmission rate is determined by either subtracting RDF from the old transmission rate or adding the old transmission rate with the RIF. If the value of ER is greater then the revised transmission rate, then the actual transmission rate for the given end system or network element is the revised transmission rate. If the value of ER is less then the revised transmission rate, then the actual transmission rate for the given end system or network element is the value of ER.

Sorter 1004 evaluates the values stored in the VC Time Table 921 in order to prioritize and schedule an ATM cell for transmission. Preferably the values stored in the VC Time Table 921 are the maturation time and expiration time 735 for the given ATM Cell entries. The sorter 1004 analyzes the time values stored in the VC time table and selects the virtual connection having the highest priority in order to schedule or queue its next ATM cell for transmission. Referring to FIG. 12A, sorter 1004 is preferably a sixteen stage serial sorter and evaluates sixteen mature active virtual connections. Each stage may use similar logic as depicted by the sorter stage 1200 illustrated by FIG. 12B. At the first stage 1221 the input expiration time 1201, an associated VCI number 1202, and a clock 1203 are input. Comparitor 1206 compares the input expiration time 1201 with the time 1241 that is stored in the register 1208.

In the case that the input expiration time 1201 is less than the time 1241 stored in the register 1208 the comparitor output 1211 causes the time 1241 stored in the register to be selected by multiplexor 1209 as output 1204 and fed into the next stage of the comparitor for comparison. Similarly the VCI value stored in register 1216 is selected for output 1205 to the next stage of the sorter by multiplexor 1217. The input expiration time 1201 is the selected output 1214 by multiplexor 1207 for storing into the register 1208 and input multiplexor 1215 selects the input VCI number 1202 as the selected output 1219 for storing into the register 1216.

In the case that the input expiration time 1201 is greater than the time 1241 stored in the register 1208, the comparitor output 1211 causes the input expiration time 1201 to be selected by multiplexor 1209 as output 1204 and fed into the next stage of the comparitor for comparison. Similarly the input VCI value 1202 is selected for output 1205 to the next stage of the sorter 1004 by multiplexor 1217. The time 1241 output from register 1208 is the selected output 1214 by multiplexor 1207 for storage back into the register 1208. Similarly multiplexor 1215 selects the VCI number 1218 stored in register 1216 as the selected output 1219 for storage back into the register 1216. The last stage 1236 of the sorter discards an expiration time at output 1204 and the associated VCI number at output 1205.

After the sort is complete, the smallest expiration time of the sorted ATM cells is stored in the first stage 1221 of the sorter with the next smallest expiration time stored in the second stage 1222. The VCI number 1218 stored in register 1216 of the first stage 1221 has its ATM cell scheduled for transmission next as the scheduled VC out 1038.

Once a sort is completed by the sorter 1004 and the ATM cell stored in the first stage 1221 having the earliest expiration time is scheduled for transmission, the data stored in stages 1222 through 1236 are shifted serially shifted to the prior stages 1221 through 1235. The respective outputs 1241 and 1218 of registers 1208 and 1216 are sent to the prior stage. Multiplexors 1207 and 1215 select the respective R inputs prior expire time 1244 and prior vci 1245 to be stored into registers 1208 and 1216. In this manner the stages 1222–1236 may respectively shifted into prior stages 1221–1235. This resets the sorter so that a new expiration time 1201 for a given VCI 1202 may be sorted.

Once a given ATM cell for a virtual connection has been scheduled the virtual connection must be rescheduled for its next ATM cell to be transmitted. If there are no more ATM cells to be transmitted than the virtual connection becomes inactive and it is not necessary to reschedule. Rate Adjustment Logic 1002 is performed by microcode that sets the maturation and expiration time for the next ATM cell for the virtual connection that has just had a prior ATM cell scheduled or queued for transmission. Rate Adjustment Logic 1002 tries to maintain the periodicity of ATM cell transmission for the given virtual connection. In order to do so the VC parameter values for the given virtual connection stored in the VC parameter table 920 are read and provided to the Rate Adjustment Logic 1002. Rate Adjustment Logic then sets the prioritization values for the given channel and stores these values in the VC Time Table 921. Based on any backward RM cells that have been received, the parameters stored in the VC Parameter Table for the virtual connections, and the currently sorted expiration time values in the sorter 1004, the prioritization values, expiration time and maturation time, are adjusted for the next ATM cell and stored into the VC Time Table 921. As the sorter 1004 re-sorts through the VC Time Table values it eventually reschedules the next ATM cell for transmission.

Figure 13:
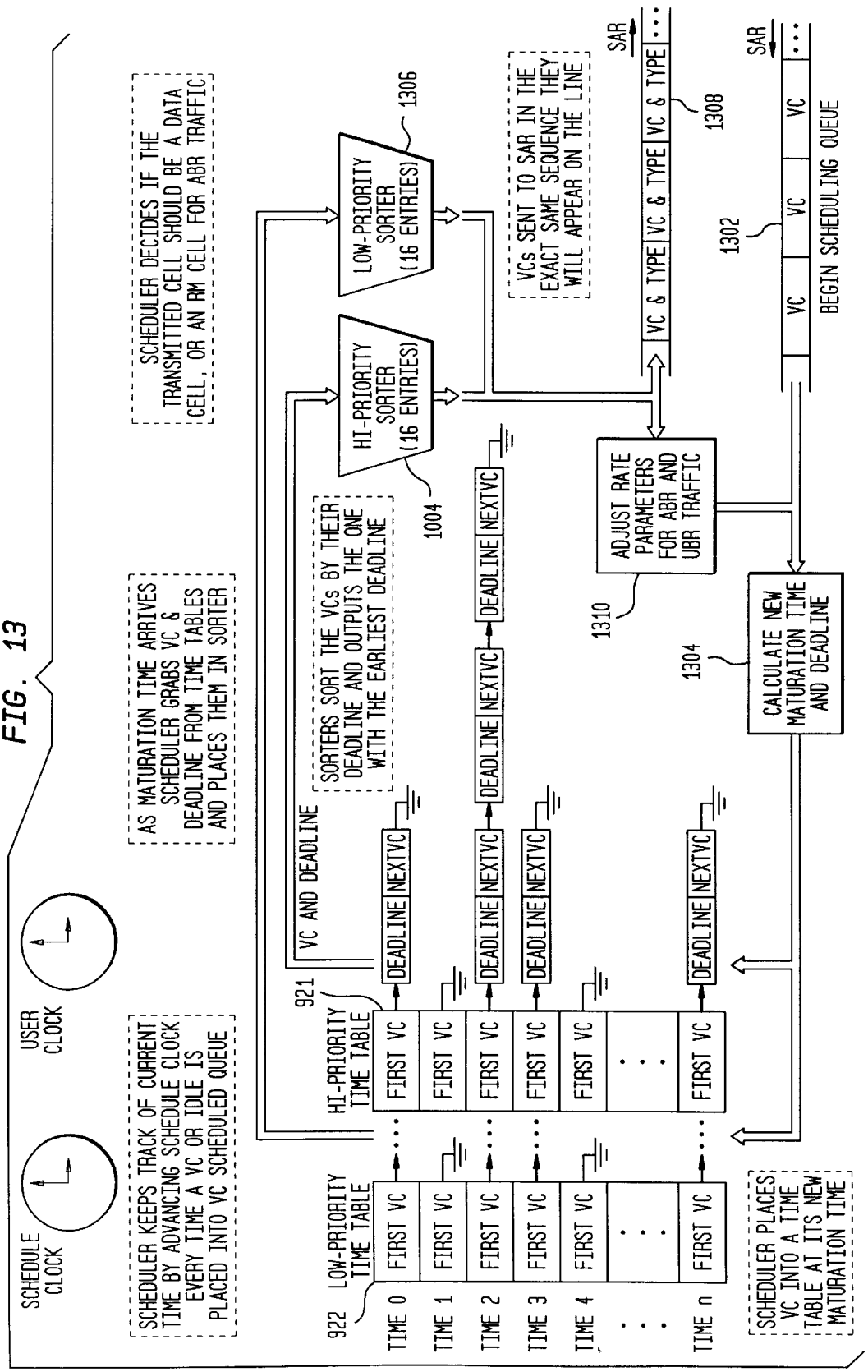
FIG. 13 is a diagram illustrating the flow of scheduling ATM cells for the first and second embodiments of the present invention.
Figure 14:
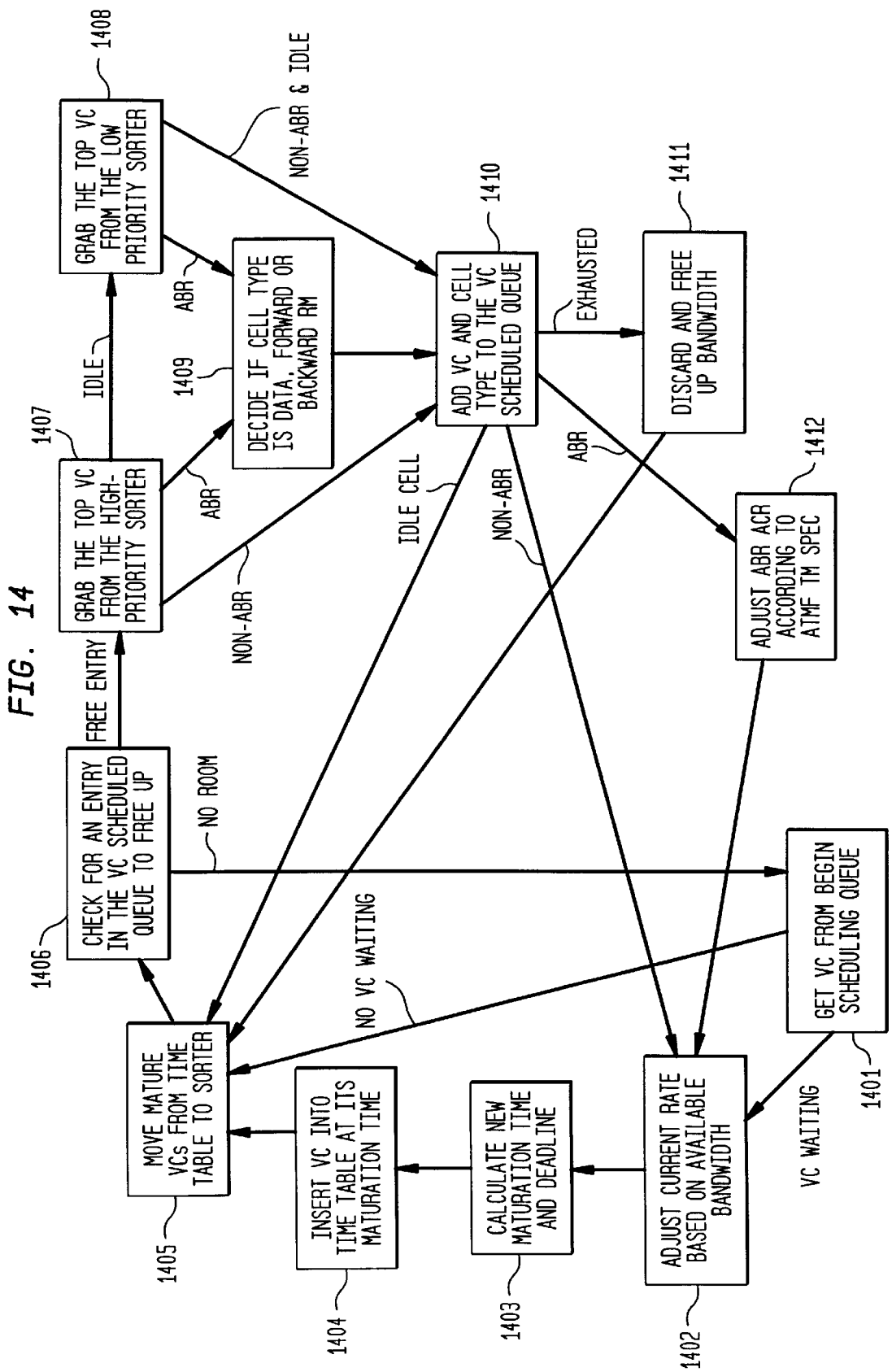
FIG. 14 is a flow diagram illustrating microcode execution for the first and second embodiments of the present invention.

FIG. 13 illustrates the functionality of a second embodiment of the present invention. FIG. 14 illustrates a flow chart of the scheduling and rate adjustment microcode program stored in RAM 1006 for the microcode engine 1008 in accordance with the second embodiment. FIG. 13 and FIG. 14 are generally applicable to operation of the first embodiment. In the case of the second embodiment, memory 704 includes the partitions for the High Priority VC Time Table 921 and the Optional Low Priority VC Time Table 922. Scheduler 904 is altered in that it has a High Priority Sorter 1004 and a Low Priority Sorter 1306 for respectively sorting and prioritizing the virtual connections represented by the values stored in the High Priority VC Time Table 921 and the Low Priority VC Time Table 922.

Referring to FIG. 13, when a host opens a connection the SAR controller 702 places the VC in the Begin Scheduling Queue 1302. Next at step 1304, the SAR calculates the maturation time and deadline or expiration time for the new virtual connection or for a open connection that has currently had an ATM transmitted. ATM cells associated with a virtual connection desiring to be transmitted have their maturation time and VCI number placed into either the High Priority VC Time Table 921 or the Low Priority Time Table 922. Virtual connections requesting CBR service have very strict rules for the amount of delay tolerated. For CBR service traffic, the respective maturation time and VCI number stored into the High Priority VC Time Table 921 while other traffic is stored into Low Priority Time Table 922. Counter 1009 in the microcode engine 1008 keeps track of the current time. Upon the maturity time being reached for a given cell, the VCI number is converted into an address into the VC parameter table and the expiration time or deadline is read out from memory 704. The VCI number and the respective expiration time are placed into either the High Priority Sorter 1004 or the Low Priority sorter 1306. Virtual connections with a CBR service are placed into the High Priority Sorter 1004. The sorters 1004 and 1306 sort on the expiration time or deadline. Sorters 1004 and 1306 depicted in FIG. 13 sort similarly to the description of sorter 1004 illustrated in FIG. 12A and FIG. 12B. Scheduler 904 determines if the ATM data cell for the virtual connection with the earliest deadline can be transmitted or if an RM cell is required to be transmitted into the current time slot. After an ATM data cell has been scheduled for transmission in the VC scheduled Queue 1308, if the virtual connection has more data to be sent then a rescheduling process occurs. Virtual connections using ABR or UBR service has its VC parameters updated or modified at step 1310 based upon the capacity of the network determined from received RM cells. The cycle next repeats itself at step 1304 calculating a new maturation time and expiration time or deadline. The scheduler 904 puts the VCI number requesting transmission at the end of the series of existing VCI numbers. In this manner the linear sequence of the virtual connections stored in the VC Time Table 921 and 922 represents their maturation time.

Referring to FIG. 14 and microfiche appendix, at step 1401 microcode engine (ME) 1008 gets any waiting new Virtual Connection from the begin scheduling queue. If no VC is waiting to have an ATM cell transmitted, the ME 1008 jumps to step 1405 where the mature virtual connections within the VC time table are transferred from the time table to the sorter 1004. If a new virtual connection is waiting ME 1008 goes to step 1402. At step 1402, the ACR parameter for the given virtual connection is adjusted based on the available bandwidth. Knowing the adjusted ACR, the maturation time and the expiration time or deadline can be calculated at step 1403 by the ME 1008. The VCI and maturation time for the given virtual connection is inserted into the VC time table at step 1404. As the counter 1009 counts it determines when a given VC in the VC time table has reached maturity and then reads out the expiration time from the VC parameters for the given virtual connection from the VC parameter table at step 1405 and provides these values to the sorter 1004 or 1306. Sorter 1004 and 1306 then sort the values within the sorters to determine the virtual connection with the highest priority for transmission which is the VCI that has the smallest expiration time. At step 1406 the ME 1008 determines if there is an entry available in a VC scheduled queue such that a new entry may be inserted. If there is no free entries in the scheduled queue the ME 1008 jumps to step 1401 and repeats steps 1401 through 1406. If there is a free entry in the VC scheduled queue, ME 1008 goes to step 1407. At step 1407, the virtual connection having an ATM cell with the highest priority is selected from the high priority sorter 1004 and the ME 1008 analyzes the ATM cell and the VC parameters of the associated virtual connection. If no virtual connection is present in the high priority sorter 1004, it is idle and the ME 1008 jumps to step 1408 and considers the low priority sorter 1306. If virtual connection with the highest priority ATM cell is using an ABR type of service, the ME goes to step 1409. At step 1409, the ME 1008 determines if the ATM cell is a data type of ATM cell (VC/VP cell), a forward RM cell, or a backward RM cell and then goes to step 1410. This determination is performed to implement ATM Forum source behavior rules on cell type prioritization. If virtual connection with the highest priority ATM cell is using a non-ABR type of service, the ME 1008 goes directly to step 1410, skipping step 1409. At step 1410 the VCI number and VC cell type are added to the VC scheduled queue for transmission. When a scheduled VC is discovered to have no more data to transmit, the ME 1008 goes to step 1411, where the VC is discarded and a new scheduling attempt on the remaining VCs is performed. If the ATM cell was an Idle cell, the ME 1008 goes to step 1405. If the ATM cell is determined to be for a service other than ABR, the ME goes to step 1402 to reschedule the virtual connection in order to transmit the next ATM cell. If the ATM cell is determined to be for an ABR service, then the ME 1008 goes to step 1412 where the rate adjustment operations are performed. At step 1412, the ME 1008 causes the ACR to be adjusted according to the ATM forum traffic management specification attached hereto as part of the microfiche appendix. After the adjustments are made in step 1412 the ME goes to step 1402.

The operation of the microcode engine 1008 is further described in the engineering specification pages attached hereto as part of the microfiche appendix entitled "SARatoga Engineering Specification, Pages 87–108, May 18, 1996" by Advanced Logic which is incorporated herein by reference.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A unified scheduler for prioritizing and scheduling a plurality of fixed length communication cells for multiple virtual communication channels of a communication network, the unified scheduler comprising:
    a rewritable storage unit for storing schedule times of fixed length communication cells of the multiple virtual communication channels and for storing virtual communication channel parameters used to compute a next scheduled time for a fixed length communication cell, said parameters including a cell delay variation tolerance and an allowed cell period;
    a sorter, coupled to the rewritable storage unit, for sorting schedule times and determining the priority of the transmission of the plurality of fixed length communication cells on their respective virtual communication channels and selecting a prioritized fixed length communication cell for transmission;
    a programmable microcontroller, coupled to the rewritable storage unit, for computing the next scheduled time from a current time and a virtual communication channel's parameters, said programmable microcontroller having a second rewritable storage unit for storing a scheduling and rate adjustment program, said microcontroller computes the next scheduled time by adding the current transmission time with a modified parameter of the allowed cell period to generate an ideal next scheduled time, said modified parameter being generated by said rate adjustment program.

2. The unified scheduler of claim 1 wherein said sorter sorts on the schedule time stored in the rewritable storage unit for determining the priority of transmission of the plurality of fixed length communication cells.

3. The unified scheduler of claim 1 wherein the computation of the next scheduled time is initiated at a time of transmission of the prioritized fixed length communication cell.

4. The unified scheduler of claim 1 wherein said programmable microcontroller modifies, while computing the next scheduled time, the virtual communication channel parameters stored in the rewritable storage unit to reflect the available capacity of the communication network.

5. The unified scheduler of claim 1 wherein said sorter comprises a plurality of stages serially coupled to one another and wherein a stage of said sorter comprises:
    a rewritable storage unit for storing a stored value;
    a comparitor for comparing an input value with a stored value and generating a comparison output; and
    a multiplexor, coupled to the comparitor and the rewritable storage unit, for selecting between the input value and the stored value as storage into said rewritable storage unit and as an output from the stage.

6. The unified scheduler of claim 5 wherein said stage of said sorter further comprises a second rewritable storage unit for storing a stored communication identification;
    a second multiplexor, coupled to the second rewritable storage unit, for selecting between an input communication identification and the stored communication identification as storage into said second rewritable storage unit and as a second output from the stage.

7. The unified scheduler of claim 1 wherein said programmable microcontroller adds the ideal next scheduled time with the cell delay variation tolerance to generate an expiration time, said expiration time being used to prioritize cell scheduling.

8. The unified scheduler of claim 1 wherein said programmable microcontroller subtracts the cell delay variation tolerance from the ideal next scheduled time to generate a maturation time, said maturation time being used to determine cell transmission eligibility.

9. The unified scheduler of claim 1 wherein
    said means of computing the next scheduled time has a counter for maintaining the current time.

10. A network interface communication controller for controlling the flow of fixed length communication cells over a communication channel, comprising;
    a rewritable storage for sorting parameters, a priority and an identity of the communication channel;
    a segmentation and reassembly (SAR) controller, coupled to a system bus, a network transmission link, a network receiving link and the rewritable storage, for prioritizing and scheduling the flow of fixed length communication cells by analyzing the parameters and the priority of the communication channel and selecting a channel with the highest priority for scheduling, said parameters including a cell delay variation delay tolerance (CDVT) and an allowed cell period (ACP), said priority being an expiration time computed by adding the cell delay variation tolerance to an ideal next scheduled time, said ideal next scheduled time being computed by adding a modified parameter, allowed cell period, to a current transmission time, said modified parameter being generated by a rate adjustment program.

11. The network interface communication controller of claim 10 wherein
    said rewritable storage uses linked lists to store the priority and identity of the communication channel.

12. The network interface communication controller of claim 10 wherein said segmentation and reassembly (SAR) controller analyzes a communication channel having a first priority with a first sorter.

13. The network interface communication controller of claim 10 wherein said segmentation and reassembly (SAR) controller analyzes a communication channel having a second priority with a second sorter.

14. The network interface communication controller of claim 10 wherein said rewritable storage has a first partition for storing a list of communication channels having the first priority and a second partition for storing a list of communication channels having the second priority.

15. A segmentation and reassembly (SAR) controller for controlling the flow of fixed length communication cell over a communication path and channel of a communication network, the SAR controller comprising:

a system bus interface for coupling to a system bus and communicating to a host system;

a storage controller, for coupling to a rewritable storage having scheduled times and virtual communication channel parameters data stored therein, addressing the rewritable storage, and reading the data from and writing the data into the rewritable storage;

a network output interface for coupling to a transmission cabling of the network;

a network input interface for coupling to receiving cabling of the network;

a segmenter, coupled to the system bus interface, the memory controller, and the network output interface, for segmenting data into prioritized fixed length communication cells;

a scheduler coupled to the segmenter and the memory controller, having a sorter and a microcode engine for sorting and scheduling the prioritized fixed length communication cells for transmission out to the network based on the scheduled times and virtual communication channel parameters, said microcode engine computes the next scheduled time by adding the current transmission time with the modified parameter of the allowed cell period to generate an ideal next scheduled time, said modified parameter being generated by a rate adjustment program, said ideal next scheduled time being used to compute an expiration time and a maturation time;

a reassembler, coupled to the system bus interface, the memory controller, and the network input interface, for removing the header from the prioritized fixed length communication cells and reassembling them into usable data, the reassembler further comprising:

a DMA controller coupled to the system bus interface for communicating user data onto the system bus, and a network feedback logic coupled to the network input interface for reading the prioritized fixed length communication cells received from the network and adjusting the sorting and scheduling of the prioritized fixed length communication cells by the scheduler.

16. The segmentation and reassembly (SAR) controller of claim 15 wherein said scheduler utilizes linked list data structures to store scheduling information.

17. The segmentation and reassembly (SAR) controller of claim 16 wherein said scheduler includes a second sorter for sorting and scheduling the prioritized fixed length communication cells having a second priority and generating linked lists addresses for the storage controller.

18. A method of prioritizing and scheduling the flow of fixed length communication cells over a communication channel of a communication network, the steps comprising:

a) computing a priority value for a fixed length communication cell based on communication channel parameters, said priority value being an expiration time computed by adding a cell delay variation tolerance to an ideal next scheduled time, said ideal next scheduled time being computed by adding a modified allowed cell period to a current transmission time, said modified allowed cell period being computed by a rate adjustment program;

b) storing the priority value and an identifier of the fixed length communication cell into a rewritable storage unit;

c) sorting on the priority value of the fixed length communication cell to determine the cell having the highest priority;

d) selecting the fixed length communication cell having the highest priority for transmission over the communication channel of the communication network; and e) repeating steps (a) through (d).

19. The method of prioritizing and scheduling the flow of fixed length communication cells of claim 18, further comprising the step of:

rescheduling when steps (a) through (d) should be repeated utilizing virtual communication channel parameters.

20. A scheduler for sorting and scheduling the flow of fixed length communication cell over a communication path and channel of a communication network, the scheduler comprising:

a) a microcode engine which includes a scheduling and rate adjustment program and which computes the next scheduled time by adding the current transmission time with a modified parameter of the allowed cell period to generate an ideal next scheduled time, said modified parameter being generated by said rate adjustment program;

b) a sorter for determining the priority of a fixed length cell for transmission onto a communication network and for selecting said cell for transmission as a function of its priority.

21. The scheduler of claim 20 wherein said priority is a function of an expiration time, said expiration time computed by adding a cell delay variation tolerance to said ideal next scheduled time, and wherein said microcode engine also computes a maturation time equal to the sum of said ideal next scheduled time and the cell delay variation tolerance, said maturation time being used by said scheduler to determine eligibility of transmission of the plurality of fixed length communication cells onto the network.

* * * * *